United States Patent
Gates et al.

(10) Patent No.: US 9,457,386 B2
(45) Date of Patent: Oct. 4, 2016

(54) METHOD OF CLEANING A FOOD OR BEVERAGE DISPENSER

(71) Applicant: FBD PARTNERSHIP, LP, San Antonio, TX (US)

(72) Inventors: Matthew Grayson Gates, Schertz, TX (US); Jimmy Irving Frank, Pasadena, TX (US); David A. Renaud, San Antonio, TX (US)

(73) Assignee: FBD Partnership, LP, San Antonio, TX (US)

( * ) Notice: Subject to any disclaimer, the term of this patent is extended or adjusted under 35 U.S.C. 154(b) by 0 days.

(21) Appl. No.: 14/928,873

(22) Filed: Oct. 30, 2015

(65) Prior Publication Data

US 2016/0089702 A1    Mar. 31, 2016

Related U.S. Application Data

(63) Continuation of application No. 13/691,001, filed on Nov. 30, 2012, now Pat. No. 9,173,521.

(51) Int. Cl.
| | | |
|---|---|---|
| *B08B 9/02* | (2006.01) | |
| *A47J 31/60* | (2006.01) | |
| *B67D 1/07* | (2006.01) | |
| *B65D 51/18* | (2006.01) | |
| *B65D 51/28* | (2006.01) | |

(52) U.S. Cl.
CPC .............. *B08B 9/02* (2013.01); *A47J 31/60* (2013.01); *B65D 51/28* (2013.01); *B67D 1/07* (2013.01); *B67D 2001/075* (2013.01)

(58) Field of Classification Search
CPC ........... A23G 9/30; A47J 31/60; B67D 1/07; B67D 2001/075
See application file for complete search history.

(56) References Cited

U.S. PATENT DOCUMENTS

| | | | |
|---|---|---|---|
| 2,969,073 A | 1/1961 | Du Broff | |
| 3,410,303 A * | 11/1968 | Johnson, Jr. ......... | B67D 1/0887 137/381 |
| 3,677,272 A | 7/1972 | Schrank et al. | |
| 4,213,795 A | 7/1980 | Ernstsson et al. | |

(Continued)

FOREIGN PATENT DOCUMENTS

| | | | | |
|---|---|---|---|---|
| CH | WO 2009124786 A1 * | 10/2009 | .............. | A47J 31/60 |
| WO | WO2013082453 A2 | 6/2013 | | |

OTHER PUBLICATIONS

International Search Report and Written Opinion issued in co-pending PCT Patent App. No. PCT/US12/67336 dated Feb. 19, 2013 (10 pages).

*Primary Examiner* — Nicole Blan
(74) *Attorney, Agent, or Firm* — Dykema Gossett P.L.L.C.

(57) ABSTRACT

A food and beverage dispenser for dispensing food and beverage products may have a clean in place (CIP) system that functions with minimal to no operator interface and disassembly. The dispenser may include one or more product barrels and an ingredient supply refrigerator. A nozzle cap containing a cleaning/sanitizing agent may be placed on a dispensing valve of the dispenser, and a CIP connector may be connected to a BIB connector after disconnecting the BIB connector from a BIB package. The CIP connector completes a CIP circuit that places the product barrel in fluid circulation with a water source and optionally another sanitizer source to help clean the dispenser in place. A heater may be included in the CIP circuit to heat the circulating fluid. A microcontroller or other computer processor may control the CIP process.

5 Claims, 16 Drawing Sheets

(56) References Cited

U.S. PATENT DOCUMENTS

| | | |
|---|---|---|
| 4,784,697 A | 11/1988 | Bordini |
| 5,329,950 A | 7/1994 | Barinas |
| 5,740,844 A | 4/1998 | Miller |
| 6,126,045 A | 10/2000 | Last |
| 6,223,948 B1 | 5/2001 | Davis |
| 6,331,432 B1 | 12/2001 | Bautista et al. |
| 6,457,497 B1 | 10/2002 | Adriansens et al. |
| 6,490,872 B1 | 12/2002 | Beck et al. |
| 6,889,603 B2 | 5/2005 | Carhuff et al. |
| 7,401,613 B2 * | 7/2008 | Carhuff ............... A47J 31/401 134/18 |
| 7,562,793 B2 | 7/2009 | Ufheil et al. |
| 8,079,230 B2 | 12/2011 | Frank et al. |
| 9,173,521 B2 | 11/2015 | Gates et al. |
| 2002/0043071 A1 * | 4/2002 | Frank ..................... A23G 9/045 62/135 |
| 2003/0126871 A1 | 7/2003 | Frank et al. |
| 2006/0186137 A1 | 8/2006 | Till |
| 2007/0062212 A1 * | 3/2007 | Frank ..................... A23G 9/22 62/342 |
| 2008/0203113 A1 | 8/2008 | Groh |
| 2008/0302824 A1 | 12/2008 | Blomme |
| 2009/0014464 A1 * | 1/2009 | Adbelmoteleb ........ B08B 9/032 222/1 |
| 2010/0044395 A1 | 2/2010 | Webb |
| 2010/0242993 A1 | 9/2010 | Hoang |
| 2011/0192423 A1 | 8/2011 | Boussemart |
| 2011/0248052 A1 | 10/2011 | Kelly et al. |
| 2011/0253730 A1 | 10/2011 | Isenberg et al. |
| 2013/0140328 A1 | 6/2013 | Gates et al. |

\* cited by examiner

Plan View of Refrigerator & Process Components

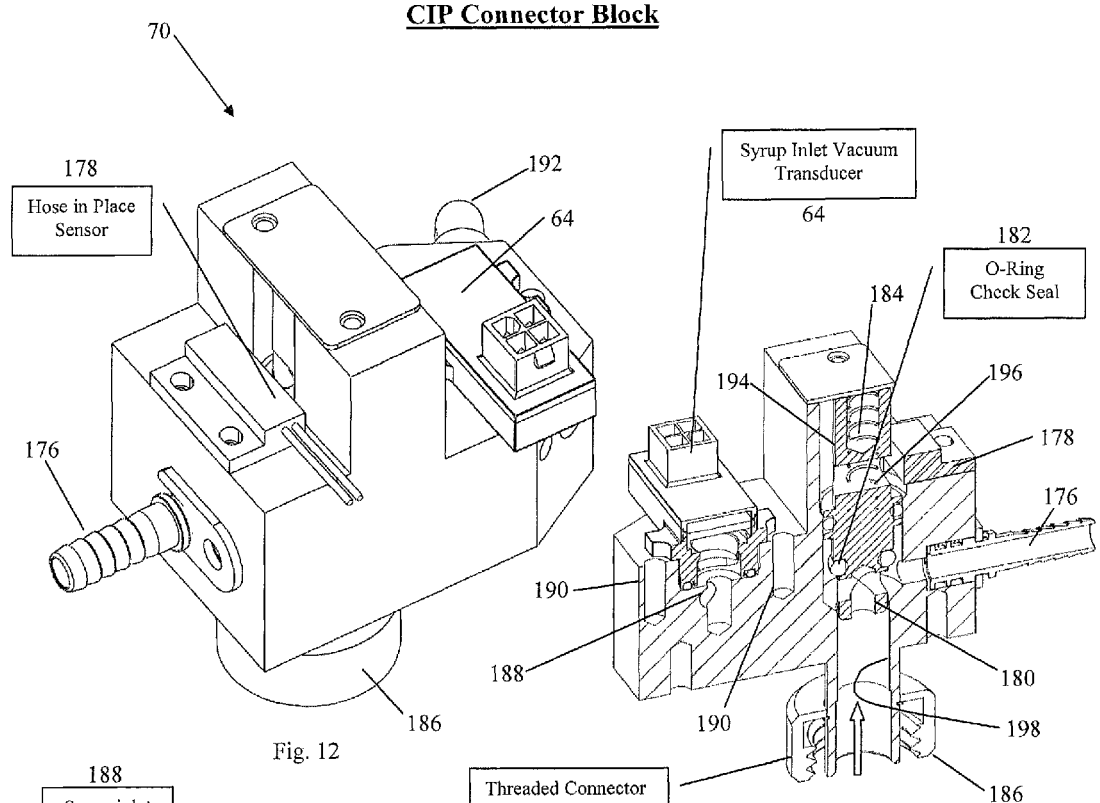
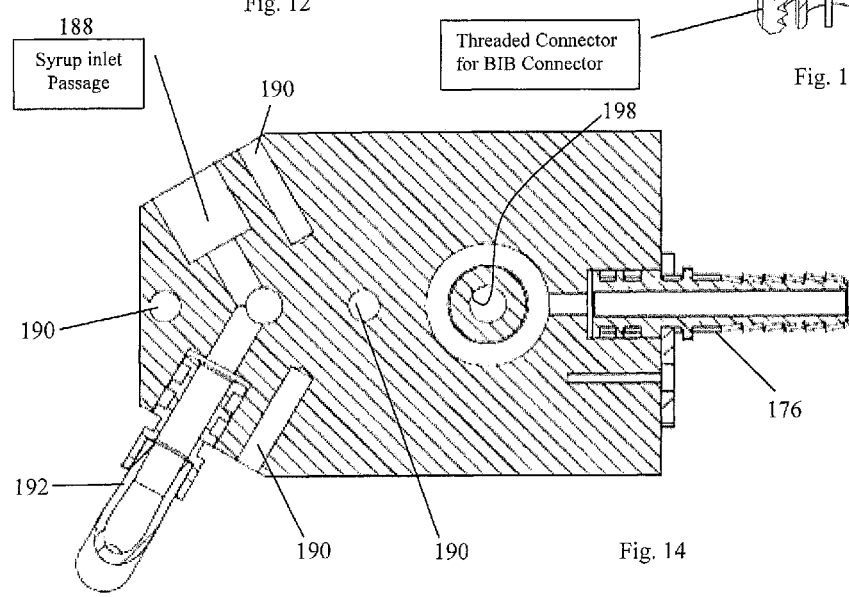

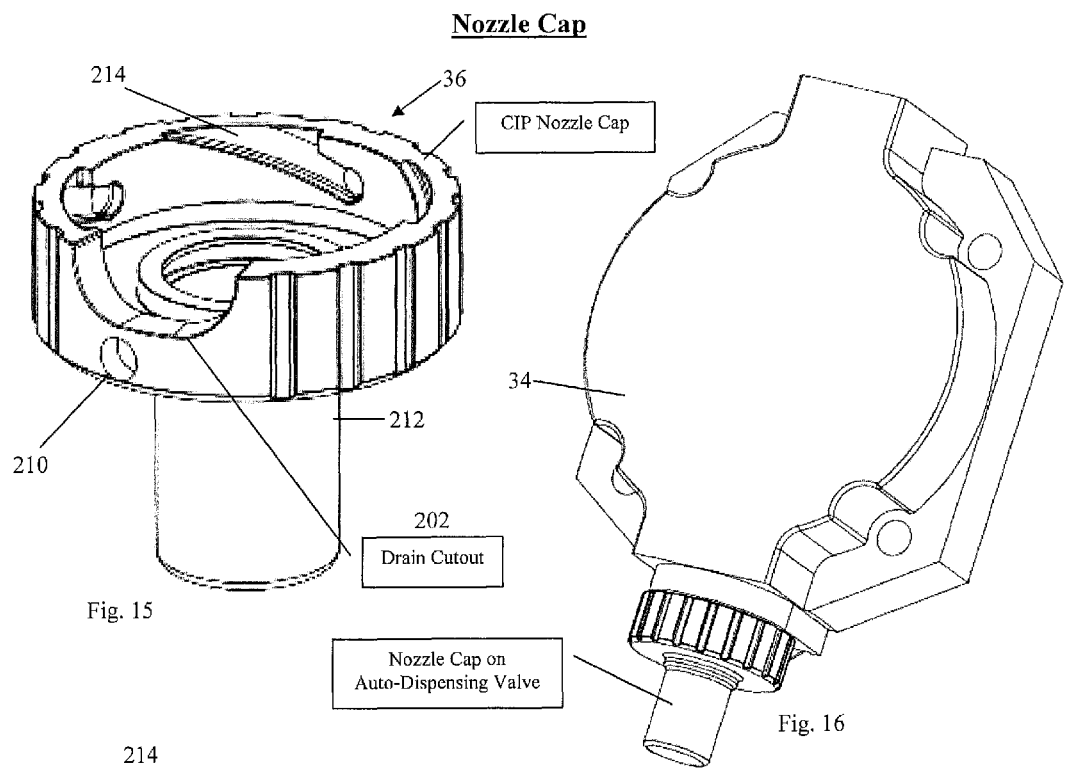
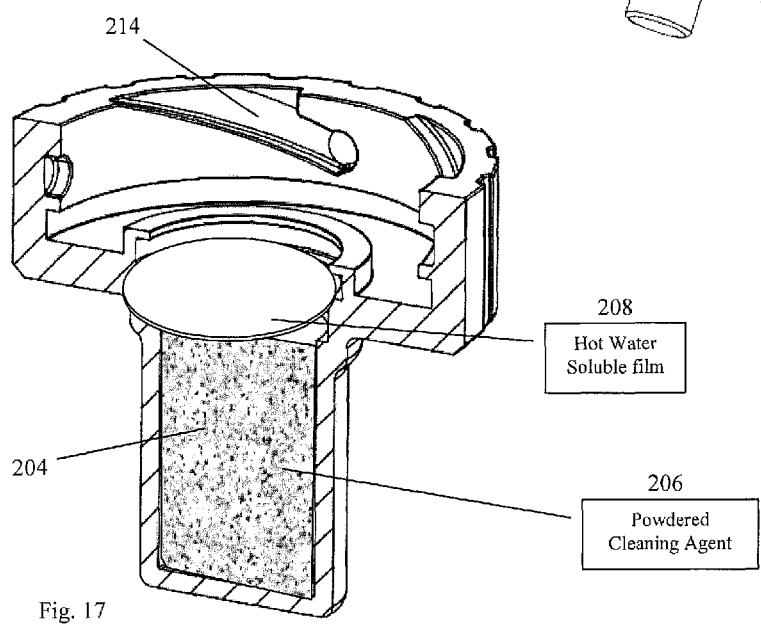

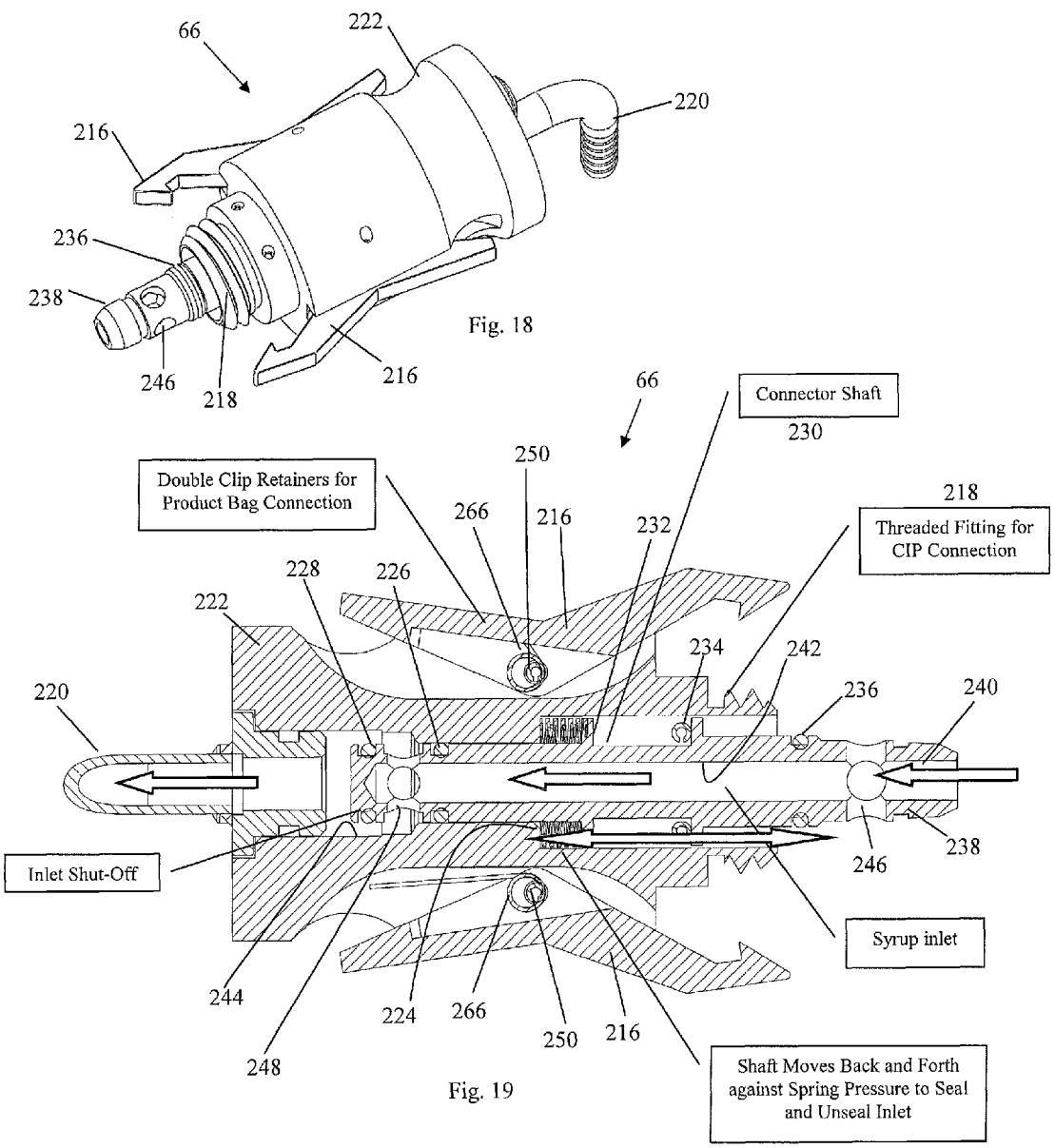

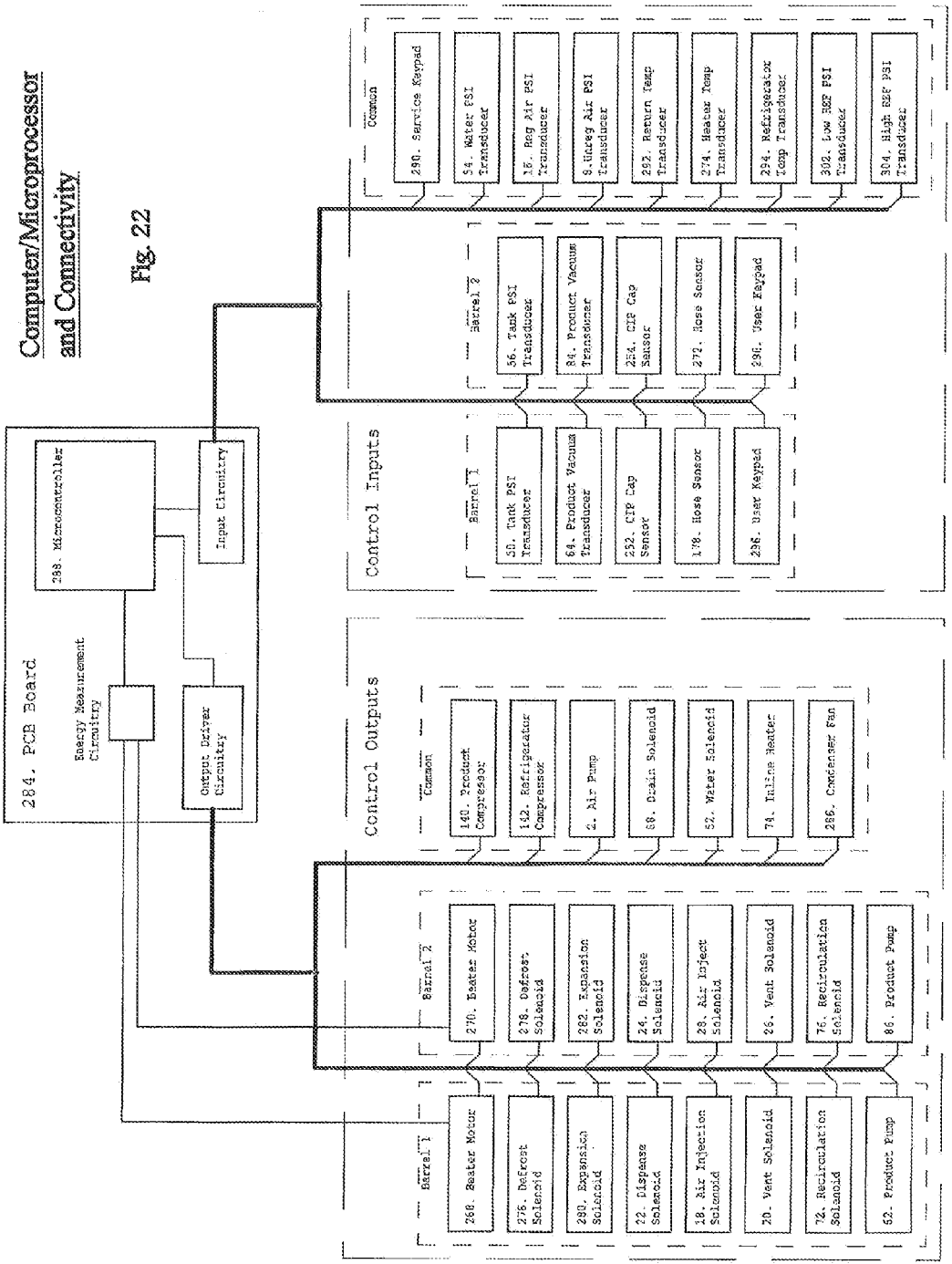

METHOD OF CLEANING A FOOD OR BEVERAGE DISPENSER

CROSS REFERENCE TO RELATED APPLICATIONS

This application is a continuation of U.S. patent application Ser. No. 13/691,001 filed Nov. 30, 2012, which claims priority to U.S. Provisional Patent Application No. 61/566,192 filed Dec. 2, 2011, the disclosure of each of which is incorporated herein by reference.

FIELD

The present application relates to food and beverage dispensers having an integrated cleaning system that allows the dispensers to be cleaned with minimal operator interface and disassembly.

BACKGROUND

In typical applications, a frozen beverage dispenser is periodically disassembled for cleaning and sanitizing. Previous attempts at creating clean in place (CIP) machines have proved problematic. Some current dispensers provide for heat pasteurization of the dispensed product on a periodic basis to destroy bacterial components and extend the clean and sanitize frequency, but such dispensers still require that the equipment be disassembled and cleaned from time to time. The heating of the product can diminish the overall quality of the dispensed product and increase cleaning difficulty. In addition, some systems are exposed to ambient contamination including introduction of bacterial components during use or cleaning. Problems persisted in previous CIP concepts regarding the cleanability of the machine and sanitizing.

SUMMARY

A food and beverage dispenser for dispensing food and beverage products may have a CIP function with minimal to no operator interface and disassembly. The dispenser may include one or more product barrels and an ingredient supply refrigerator. A nozzle cap containing a cleaning/sanitizing agent may be placed on a dispensing valve of the dispenser, and a CIP connector may be connected to a BIB connector after disconnecting the BIB connector from a BIB package. The CIP connector completes a CIP circuit that places the product barrel in fluid circulation with a water source and optionally another sanitizer source to help clean the dispenser in place. A heater may be included in the CIP circuit to heat the circulating fluid. A microcontroller or other computer processor may control the CIP process. Two refrigeration systems may be included: a primary refrigeration system that may include a reversing valve for cooling and heating the product barrels, and a secondary refrigeration system for cooling an integrated ingredient refrigerator. One refrigeration system may serve both of those purposes, but independent refrigeration systems may provide better control in some embodiments.

In some embodiments, a microprocessor or manually controlled CIP beverage dispenser may provide automated cleaning of all components that are contacted by food or beverage products that can promote bacterial growth. Such a dispenser requires minimal or no machine disassembly to perform the CIP process.

In some embodiments, a CIP process may involve injection of a cleaner/sanitizing component by use of a dispensing nozzle cap containing a sanitizing/cleaning agent that is released into a re-circulating CIP circuit. The sanitizing/cleaning agent may be a solid, liquid, gas, powder, or combination thereof and may be contained in the nozzle cap and may be sealed using a plastic cover or coating that may be released at the appropriate time and temperature to clean and sanitize the beverage dispenser.

In some embodiments, heating a water rinse to an elevated temperature, such as a sterilizing and/or pasteurizing temperature, in a closed re-circulating circuit of a CIP system may act as a primary sterilizing and/or sanitizing step or as an ancillary sterilizing and/or sanitizing step to a cleaner/sanitizing cycle.

In some embodiments, a dispensing nozzle cap may be used to insure that a cleaner/sanitizer has been injected into a CIP system and has cleaned all components subject to contamination.

In some embodiments, a fixed circuit connected to a dispensing nozzle may establish flow to a CIP circuit without the need to manually connect a hose to the dispensing valve.

In some embodiments, a CIP dispenser may be used to perform a completely sealed method of producing a food or beverage while also providing a completely sealed protocol to clean the beverage dispenser in place.

In some embodiments, a beverage dispensing nozzle may have partitioned flow to insure a flow is circulated first through a cavity containing a cleaner/sanitizer for injection into a CIP circuit.

In some embodiments, a unitized dispenser may include a refrigerated or non-refrigerated cabinet that is applicable to concentrated or single strength syrup that may or may not require refrigeration to insure product safety.

In some embodiments, a BIB connector may provide two methods of connecting to a low pressure flow circuit or to a high pressure flow circuit that may or may not be heated and that may or may not contain an integral valve that closes on removal of a BIB package to maintain an out of syrup condition and also to prevent drips of product.

In some embodiments, a heat pump may be used to heat a refrigerant and then used to either defrost a frozen beverage freezing chamber or to elevate the temperature in a beverage dispenser CIP circuit to temperatures necessary for cleaning or sanitizing at pasteurizing and/or sterilizing temperature levels for pasteurization and/or sterilization.

In some embodiments, heating a dispensable beverage in a CIP beverage dispenser containing a re-circulating CIP circuit may pasteurize and/or sterilize the dispensable beverage at pasteurizing and/or sterilizing temperatures to periodically insure destruction of most or all harmful bacteria, mold, yeast, and other microorganisms.

In some embodiments, a pressurized gas may be injected into a sealed CIP beverage dispenser.

BRIEF DESCRIPTION OF THE DRAWINGS

FIG. 12 is a perspective view of a CIP connector.

FIG. 13 is a perspective, vertical cross-sectional view of the CIP connector of FIG. 12.

FIG. 14 is a plan, horizontal cross-sectional view of the CIP connector of FIG. 12.

FIG. 15 is a perspective view of a CIP nozzle cap.

FIG. 16 is a perspective view of the CIP nozzle cap of FIG. 15 installed on a dispensing valve.

FIG. 17 is a perspective, vertical cross-sectional view of the CIP nozzle cap of FIG. 15.

FIG. 18 is a perspective view of a differential pressure BIB connector.

FIG. 19 is a cross-sectional view of the differential pressure BIB connector of FIG. 18.

FIG. 22 is a schematic electrical diagram of the CIP system of FIG. 1.

DETAILED DESCRIPTION

Figure 1:
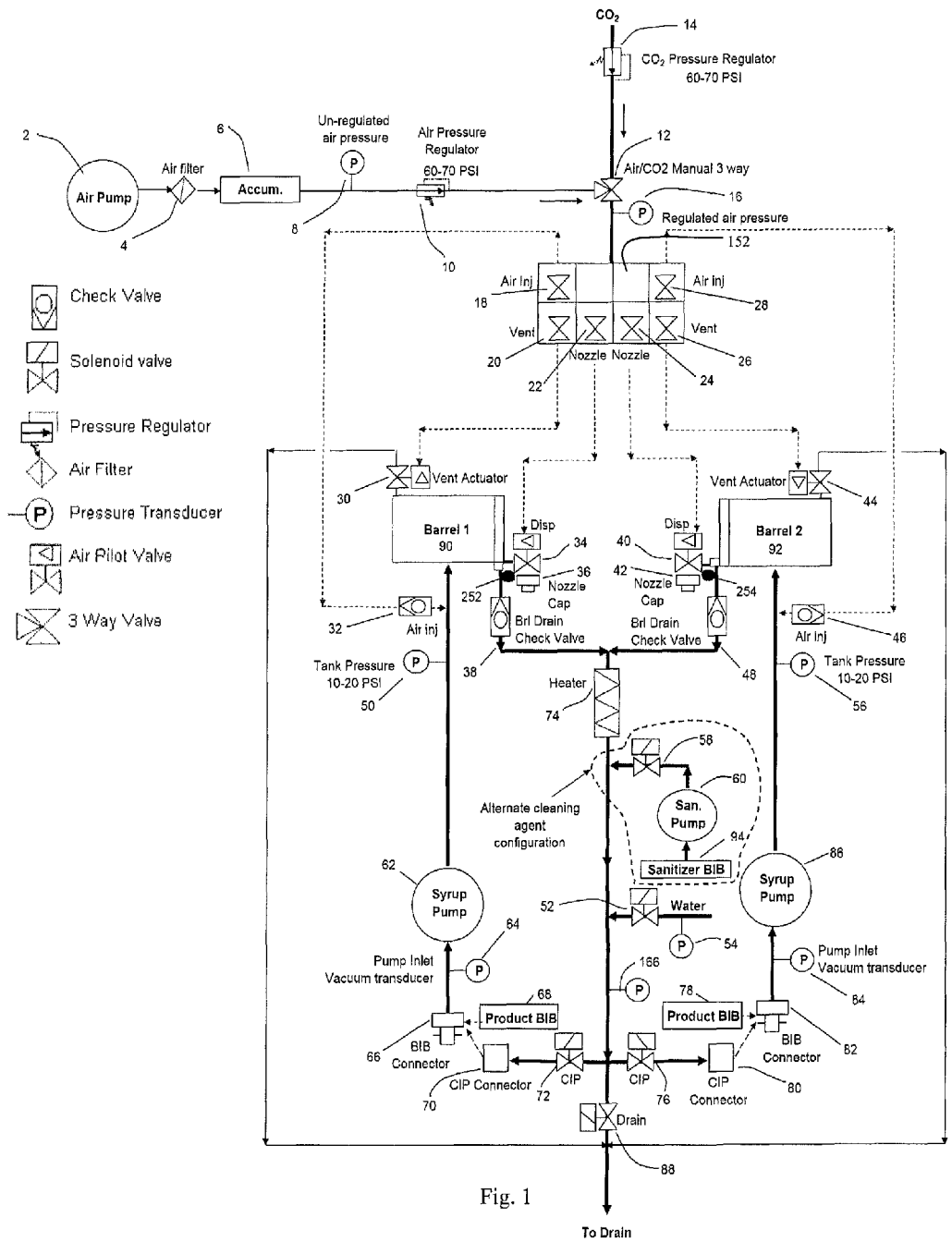
FIG. 1 is a schematic diagram of a CIP system for a food or beverage dispenser.

The following terms as used herein should be understood to have the indicated meanings unless the context requires otherwise.

When an item is introduced by "a" or "an," it should be understood to mean one or more of that item.

"Communication" means, with respect to signals, the transmission of one or more signals from one point to another point. "Communication" means, with respect to fluids, the transmission of one or more fluids from one point to another point. "Communication" means, with respect to thermal transfer, the transmission of heat from one point to another point. Communication between two objects may be direct, or it may be indirect through one or more intermediate objects.

"Comprises" means includes but is not limited to.

"Comprising" means including but not limited to.

"Computer" means any programmable machine capable of executing machine-readable instructions. A computer may include but is not limited to a general purpose computer, microprocessor, computer server, digital signal processor, or a combination thereof. A computer may comprise one or more processors, which may comprise part of a single machine or multiple machines.

"Computer readable medium" means an article of manufacture having a capacity for storing one or more computer programs, one or more pieces of data, or a combination thereof. A computer readable medium may include but is not limited to a computer memory, hard disk, memory stick, magnetic tape, floppy disk, optical disk (such as a CD or DVD), zip drive, or combination thereof.

"Having" means including but not limited to.

"Signal" means a detectable physical phenomenon that is capable of conveying information. A signal may include but is not limited to an electrical signal, an electromagnetic signal, an optical signal, an acoustic signal, or a combination thereof.

As shown in FIGS. 1-5, a CIP system 100 of a food or beverage dispenser may clean and sanitize the dispenser through the injection of a cleaner/sanitizer into a re-circulating CIP circuit which may include all components of the dispenser that are contacted by the food or beverage product to be dispensed. In addition, a heater 74 may be included in the CIP circuit that raises the temperature of the cleaning/sanitizing cycle to enhance cleaning and sanitizing. At some point in the CIP cycle, which may be controlled by a microcontroller 288 as shown in FIG. 22, the CIP circuit may be filled with water which is then elevated to a pasteurizing or sterilizing temperature that is high enough and sustained for a sufficient period of time to destroy hazardous bacteria, mold, yeast, or other microorganisms, typically about 161° F.-182° F. or higher, for example, although any suitable temperature may be used. Although CIP system 100 is shown configured for a dispenser having two freeze barrels 90, 92, such as dispenser 200 shown in FIGS. 7-8, CIP system 100 may be adapted for dispensers having only one freeze barrel or more than two freeze barrels. Also, although embodiments illustrated herein are shown as having freeze barrels 90, 92 for producing frozen or semi-frozen food or beverages, barrels 90, 92 may or may not be refrigerated and may be used for handling refrigerated or non-refrigerated food or beverage products. Various components of systems described herein are listed in Table 1 for ease of reference.

TABLE 1

2 Air Pump
4 Air Filter
6 Accumulator
8 Un-regulated Air Pressure Transducer
10 Air Pressure Regulator
12 Air/CO2 Three Way Valve
14 CO2 Pressure Regulator
16 Regulated Gas Pressure Transducer
18 Air Injection Air Solenoid Valve Barrel 1
20 Vent Actuation Air Solenoid Valve Barrel 1
22 Dispense Actuation Air Solenoid Valve Barrel 1
24 Dispense Actuation Air Solenoid Valve Barrel 2
26 Vent Actuation Air Solenoid Valve Barrel 2
28 Air Injection Air Solenoid Valve Barrel 2
30 Barrel 1 Vent Actuator
32 Barrel 1 Air Injection Module
34 Barrel 1 Dispensing Valve
36 Barrel 1 Nozzle Cap
38 Barrel 1 Drain Check Valve
40 Barrel 2 Dispensing Valve
42 Barrel 2 Nozzle Cap
44 Barrel 2 Vent Actuator
46 Barrel 2 Air Injection Module
48 Barrel 2 Drain Check Valve
50 Barrel 1 Tank Pressure Transducer
52 Water Inlet Solenoid Valve
54 Inlet Water Pressure Transducer
56 Barrel 2 Tank Pressure Transducer
58 Liquid Cleaner Inlet Solenoid valve
60 Liquid Cleaner Sanitizer Pump
62 Barrel 1 Product Pump
64 Barrel 1 Product Pump Inlet Vacuum Transducer
66 Barrel 1 BIB Connector
68 Barrel 1 Product BIB 70 Barrel 1 CIP Connector
72 Barrel 1 CIP Recirculation Solenoid Valve
74 Inline Heater
76 Barrel 2 CIP Recirculation Solenoid Valve
78 Barrel 2 Product BIB
80 Barrel 2 CIP Connector
82 Barrel 2 BIB Connector
84 Barrel 2 Product Pump Inlet Vacuum Transducer
86 Barrel 2 Product Pump
88 Drain Solenoid Valve
90 Barrel 1
92 Barrel 2
94 Sanitizer BIB
96 Water/Drain Quick Disconnect Water Body
98 Water/Drain Quick Disconnect Main Body
100 CIP System
102 Process Step Defrost
104 Process Step Initial Top Off Fill
106 Process Step Drain 1
108 Process Step Fill 1 (Flush 1)
110 Process Step Heat Flush 1 Water to Temp
112 Process Step Rinse Agitate/Circulate
114 Process Step Drain 2
116 Process Step Fill 2 (Clean)
118 Process Step Heat Cleaning Water to Temp
120 Process Step Clean Agitate/Circulate
122 Process Step Drain 3
124 Process Step Fill 3 (Flush 2)
126 Process Step Flush 2 Agitate/Circulate
128 Process Step Drain 4
130 Process Step Fill 4 (Sanitize)
132 Process Step Heat Sanitizing Water to Temp
134 Process Step Sanitize Agitate/Circulate
136 Process Step Cool Sanitizing Water
138 Process Step Drain 5
140 Product Compressor
142 Refrigerator Compressor
144 Beater Motors
146 Refrigerated Compartment
148 Dual circuit condenser
150 Water/Drain Quick Disconnect Mounting Hole
152 Air Actuator Manifold
154 Display
156 Product Bag Containers
158 High Capacity Refrigerator Base
160 CIP Recirculation Inlet
162 Product Barrel Inlet
164 CIP Component Tray
166 CIP Manifold Pressure transducer
168 Water Inlet Quick Disconnect Receiver
170 Drain Outlet Quick Disconnect Receiver
172 Water Inlet Quick Disconnect Fitting
174 Drain Outlet Quick Disconnect Fitting
176 CIP Connector Outlet fitting
178 Hose in Place Sensor
180 CIP Connector Piston Flow Path
182 CIP Connector O-Ring Check Seal
184 CIP Connector Piston Spring
186 CIP Threaded Connector
188 Syrup Inlet Vacuum transducer Flow Path
190 Component Mounting Holes
192 Syrup Inlet Vacuum Transducer Inlet Fitting
194 CIP Connector Piston
196 CIP Connector In Place Sensor Trigger
198 CIP Connector Flow Path
200 Dispenser
202 Drain Cutout
204 Reservoir for Cleaning/Sanitizing Agent
206 Cleaning/Sanitizing Agent
208 Hot Water Soluble Film
210 Cap in Place Sensor Trigger
212 Cleaning Agent Protrusion
214 Nozzle Cap Mounting Thread
216 BIB Connector Retaining Clip
218 BIB Connector to CIP Connector Mounting Threads
220 BIB connector Outlet Fitting
222 BIB connector Body
224 BIB Connector Piston Spring
226 BIB Connector Inlet Shutoff Lower O-Ring
228 BIB Connector Inlet Shutoff Upper O-Ring
230 BIB Connector Shaft
232 BIB Connector Shaft Spring Stop
234 Shaft Retaining Pin
236 Shaft to Product Container Seal
238 Shaft Inlet
240 Product Flow Path
242 BIB Connector Shaft Flow Path
244 BIB Connector Body Upper flow Path
246 BIB Connector Shaft Inlet Ports
248 BIB Connector Shaft Outlet Ports
250 BIB Connector Retaining Clip Retaining Pin
252 Barrel 1 Nozzle Cap in Place Sensor
254 Barrel 2 Nozzle Cap in Place Sensor
256 Quick Disconnect Water Supply Inlet Fitting
258 Quick Disconnect Drain Outlet Fitting
260 Quick Disconnect Water Shut Off
262 Quick Disconnect Water Flow Path
264 Quick Disconnect Drain Flow Path
266 BIB Connector Retaining Clip Spring
268 Water Body to Main Body Connector
270 Beater Motor Barrel 2
272 Hose In Place sensor Barrel 2
274 Heater Temp
276 Defrost Solenoid Brl1
278 Defrost Solenoid Brl2
280 Expansion Solenoid Brl1
282 Expansion Solenoid Brl2
284 PCB Board
286 Condenser fan
288 Microcontroller
290 Service Keypad
292 Return Temp Sensor
294 Refrigerator temp sensor
296 User Keypad 1
298 User keypad 2
300 Dispenser with high capacity refrigerator base
302 Low ref PSI Transducer
304 High Ref PSI Transducer
306 Beater Motor Barrel 1

Although a microcontroller 288 on a PCB board 284 is shown in FIG. 22 for controlling CIP system 100, persons of ordinary skill in the art will appreciate that any suitable computer may be used for this purpose. Microcontroller 288 may be in communication with the various components of CIP system 100 as shown in FIG. 22. In some embodiments, any two or more of such components may be in communication with each other in addition to or in lieu of communication with microcontroller 288. Microcontroller 288 may be in communication with a memory for storing and accessing data generated by CIP system 100, such as temperatures, pressures, fluid levels, and residence times, for example.

Dispensers having CIP system 100 may integrate an ingredient fill conduit, a product drain conduit, and a vent for each barrel/dispensing valve assembly in any suitable combination. That is, for each barrel/dispensing valve assembly, the ingredient fill conduit, the product drain conduit, and the vent may be provided on either the barrel or the dispensing valve. Venting may be achieved through the activation of air solenoids 20, 26 remotely opening and closing the vent actuators 30, 44, respectively. Air solenoids 22, 24 may remotely actuate the dispensing valves 34, 40, respectively. Air, $CO_2$, or other gases may be injected into each barrel 90, 92 or injected into the product stream prior to introduction into barrels 90, 92, such as by air solenoids 18, 28 remotely actuating injection modules 32, 46, respectively. Such gases may be injected into the barrels 90, 92 to aid aeration of the dispensed product as well as to aid in draining during various stages of the CIP cycle, as further described below.

In normal operation, a dispenser as described herein may use a ready-to-use (RTU) syrup product that has a premixed water/ingredient mixture. These ingredients may be packaged in various methods such as a bag-in-the-box (BIB) 68, 78 which may be stored in an integral refrigerator. In some embodiments, a dispenser as described herein may be used for frozen carbonated beverages, frozen uncarbonated beverages, dairy and non-dairy syrups, hot or cold non-frozen beverages, or any other food or beverage product, which may be a RTU product or may involve a concentrate that is diluted with water or other fluid at some point in the dispensing process. For example, flow controls may be designed into the system 100 to allow the injection of water and concentrated syrup into the product dispensing circuit.

The ingredients to be used in normal operation may be pumped from a BIB 68, 78 through the BIB connector 66, 82 that is attached to a conduit and a pump 62, 86, which pumps product to the barrels 90, 92. In the CIP modes, a nozzle cap 36, 42 containing a cleaner/sanitizer agent 206 (see FIG. 17) may be placed on the dispensing valve 34, 40 for cleaning and recirculation purposes. Cleaner/sanitizer agent 206 may be any suitable cleaner, sanitizer, or combination thereof, which may be in solid, powder, liquid, or gaseous form, or a combination thereof. In addition to or in lieu of cleaner/sanitizer agent 206 in nozzle cap 36, 42, a cleaner/sanitizer agent may be introduced into the CIP circuit by pumping a liquid sanitizer/cleaner into the CIP circuit from a sanitizer BIB 94 using a sanitizer pump 60 (see FIG. 4) or by introducing a powdered or other cleaning agent anywhere in the cleaning/sanitizing cycle (see FIG. 4). For example, in some embodiments, a sanitizer BIB 94 having a sanitizing agent therein may be connected to a sanitizer pump 60, which may inject the sanitizing agent into the cleaning circuit via a valve 58.

The BIB connector 66, 82 may be attached to a CIP connector 70, 80 which generates a closed loop circuit (see FIG. 1) for recirculation, heating, draining and venting. As shown in FIG. 17, internal to the nozzle cap 36, 42 is a cavity or reservoir 204 that may be filled or partially filled with cleaner/sanitizer agent 206. When the CIP re-circulating cycle is initiated, the cleaner/sanitizer agent 206 may be entrained into the CIP circuit and re-circulated to help clean and sanitize the system. For frozen beverage embodiments and some other embodiments, since a heated defrost and draining of product may first be performed through nozzle cap 36, 42, it may be desirable that the cleaner/sanitizer agent 206 not be entrained into the CIP circuit until the cleaning/sanitizing cycle starts after the draining step. This may be accomplished by sealing off or coating the cleaner/sanitizer agent 206 with a plastic or other suitable film 208 that is designed to melt above a designated temperature, such as about 140° F., for example, thus allowing the cleaner/sanitizer agent 206 to be released from reservoir 204 and entrained in the CIP circuit only during the desired phase. In some embodiments, a liquid or other suitable cleaner/sanitizer may be pumped into the CIP recirculation path via a dedicated cleaner/sanitizer pump 60. It is appreciated by those of ordinary skill in the art that a variety of alternate and/or equivalent implementations may be substituted to introduce cleaner/sanitizer agents into the CIP system at any desired point.

In some embodiments, the CIP cycle may be initiated automatically when two separate sensors respectively detect that the dispensing valve 34, 40 is attached to the nozzle cap 36, 42 and the BIB connector 66, 82 is attached to the CIP connector 70, 80. In some embodiments, the CIP cycle may be initiated on command through user interface with an integrated control panel in communication with microcontroller 288, for example. In some alternate configurations, various sensor types may be used to ensure that nozzle cap 36, 42 is in place on dispensing valve 34, 40 and that BIB connector 66, 82 is firmly attached to the CIP connector 70, 80. Sensors used for this purpose may include but are not limited to optical switches, reed switches, limit switches, RFID devices, and proximity sensors.

Figure 7:
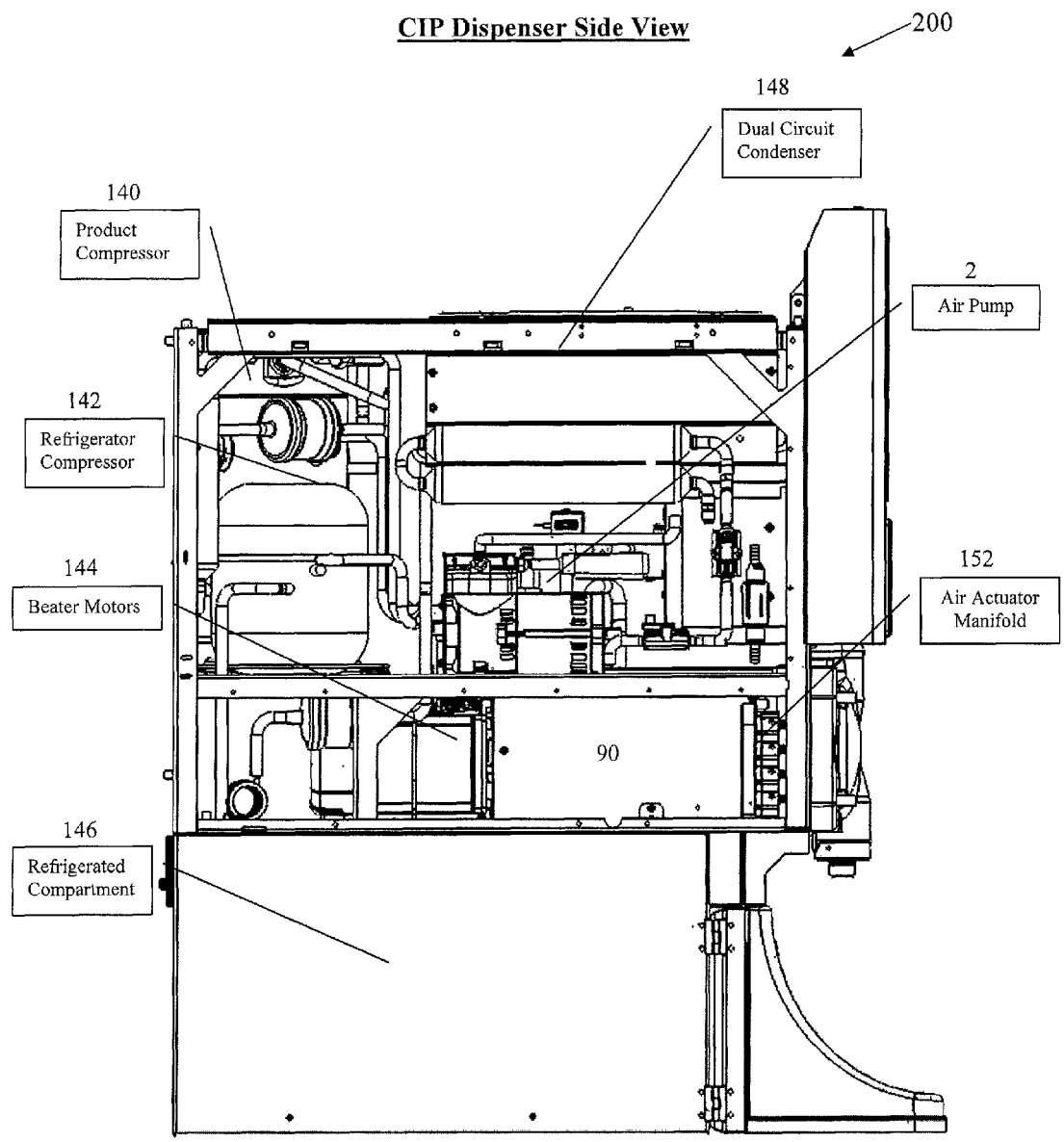
FIG. 7 is a side view of a CIP dispenser.
Figure 8:
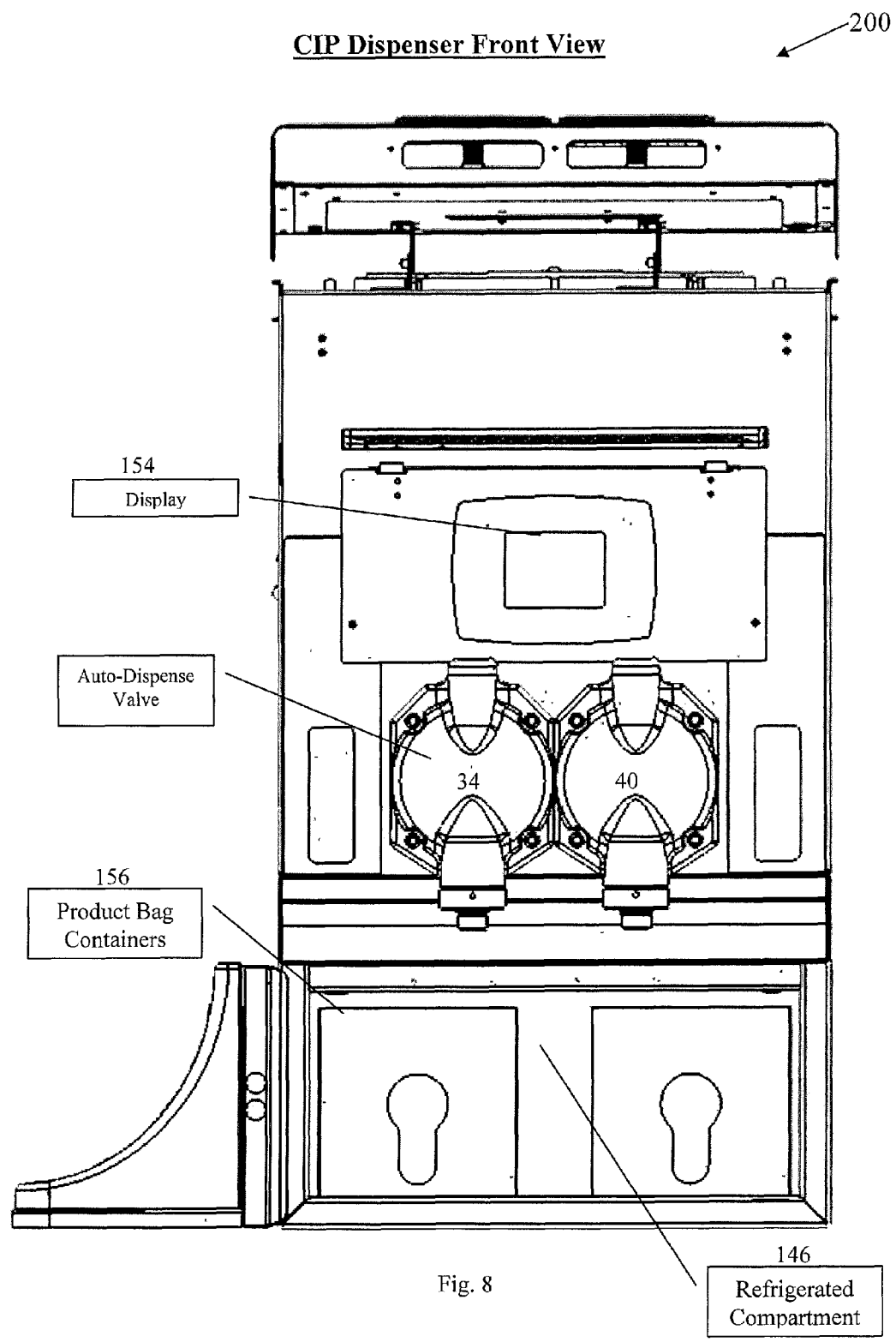
FIG. 8 is a front view of the CIP dispenser of FIG. 7.
Figure 9:
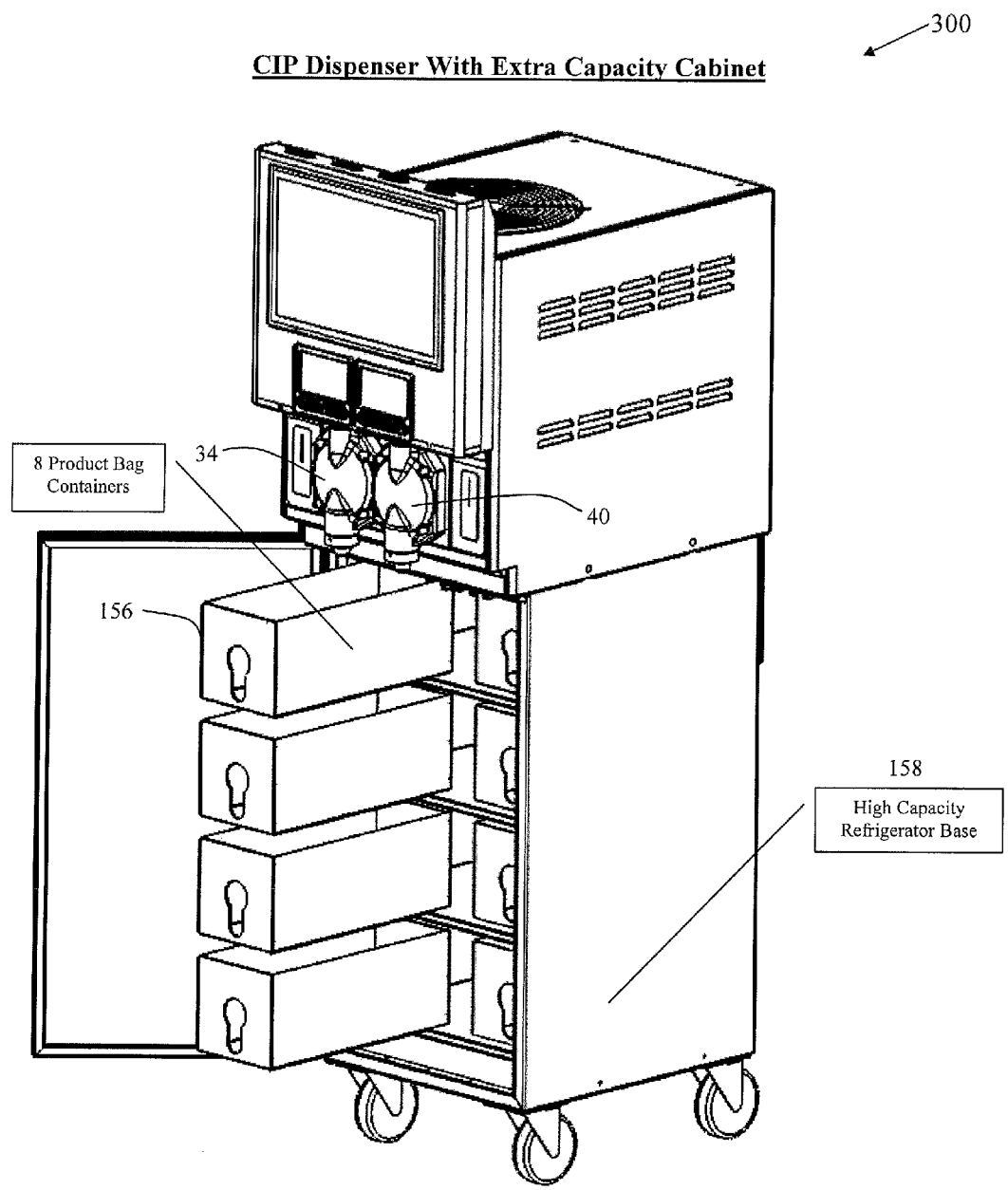
FIG. 9 is a perspective view of an alternative CIP dispenser.
Figure 10:
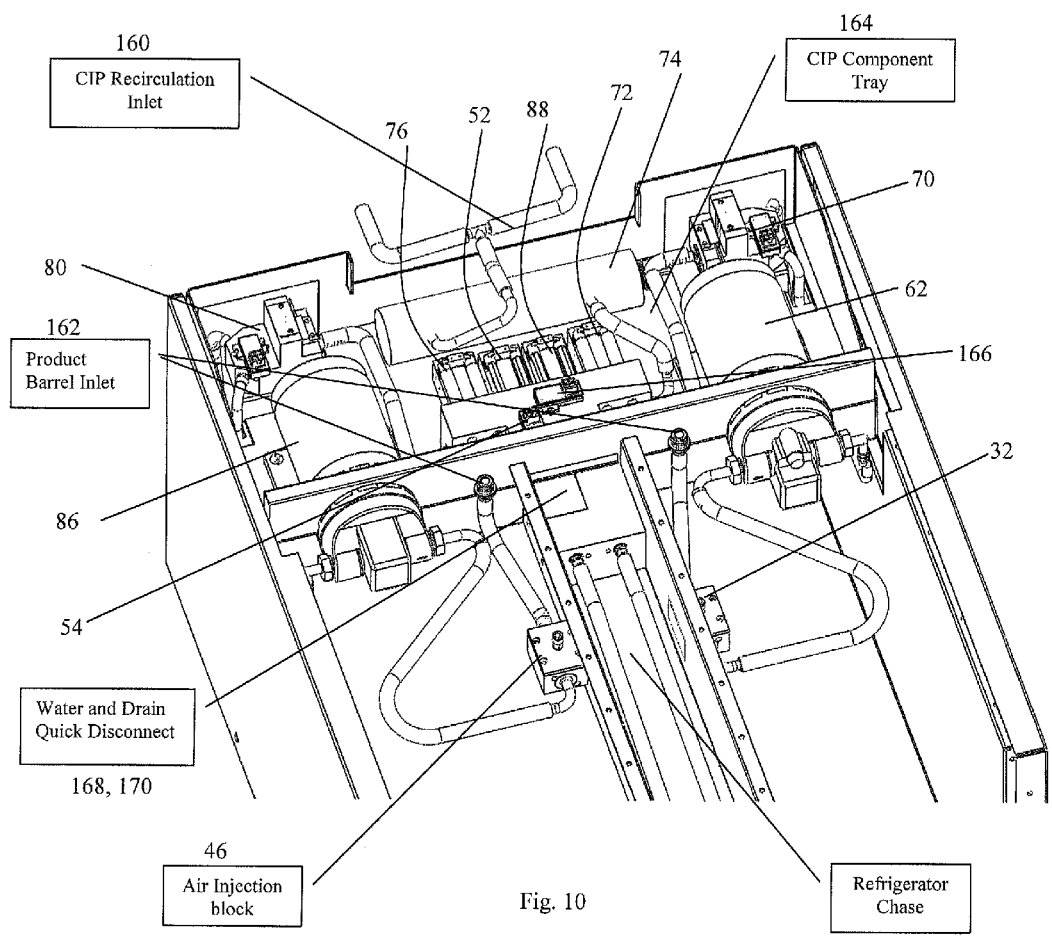
FIG. 10 is a top perspective view of a CIP portion and a refrigerator portion of the CIP dispenser of FIG. 7.
Figure 11:
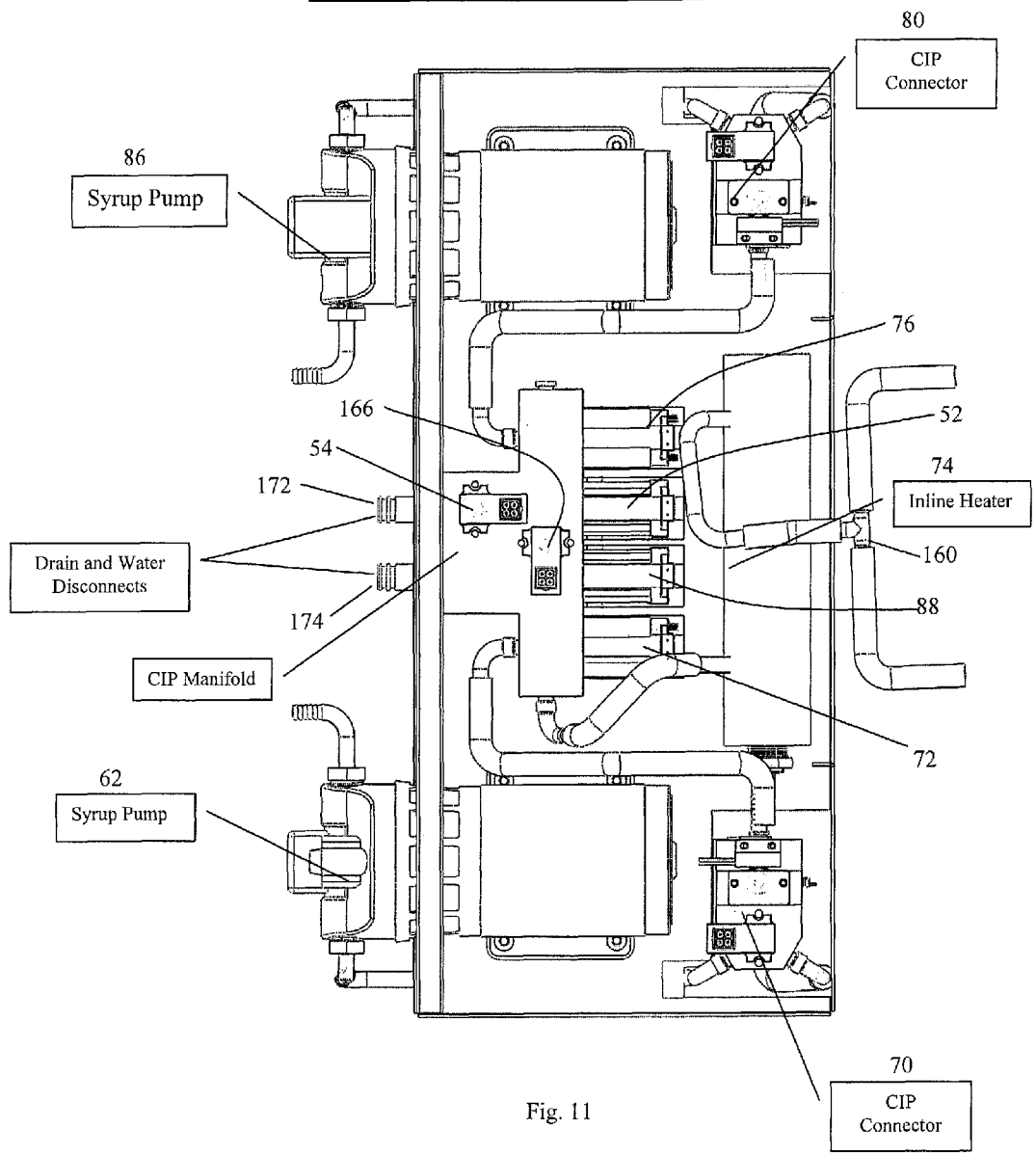
FIG. 11 is a top plan view of the CIP portion of the dispenser of FIG. 7.

As shown in FIGS. 7-8, a dispenser 200 equipped with CIP system 100 may have a refrigerated compartment 146 having one or more product bag containers 156 in which one or more product containers, such as BIB containers, are disposed. Dispenser 200 may have one or more dispensing valves 34, 40 for dispensing product from one or more barrels 90, 92. Dispenser 200 may have a product compressor 140, a refrigerator compressor 142, one or more beater motors 144 for rotating beater bars (not shown) within barrels 90, 92, a dual circuit condenser 148, and a display 154 as known in the art. As shown in FIG. 9, an alternative dispenser 300 may have a high capacity refrigerator base 158 with multiple (such as eight, for example) product bag containers 156. In some embodiments, CIP system 100 may be configured as shown in FIGS. 10-11 within a dispenser such as dispenser 200 or 300.

Referring to FIGS. 12-14, a CIP connector 70 (which may be the same as CIP connector 80) may have an inlet with a threaded connector 186, an outlet with a hose connector 176, a syrup inlet vacuum transducer 64 which detects when a vacuum is present in syrup inlet passage 188, a syrup inlet vacuum transducer inlet fitting 192, and a hose in place sensor 178 which detects when a hose is in place on hose connector 176. Threaded connector 186 may be configured for connecting CIP connector 70 to threaded fitting 218 of BIB connector 66 (see FIGS. 18-19). A piston 194 may be disposed in a flow path 198 and may slide from a first position (not shown) in which flow path 198 is closed by an O-ring check seal 182 to a second position (shown in FIG. 13) in which flow path 198 is in fluid communication with outlet 176. A spring 184 may provide a biasing force on piston 194 to hold piston 194 in the first (closed) position. When inlet 238 of shaft 230 of BIB connector 66 (see FIG. 19) is inserted into flow path 198 and engages piston 194, piston 194 may be moved to the second (open) position in order to permit fluid to flow through CIP connector 70, at which point sensor trigger 196 may cause a signal to be sent to microcontroller 288 indicating that CIP connector 70 is connected to BIB connector 66. When BIB connector 66 is removed from CIP connector 70, spring 184 may cause piston 194 to return to the closed position. One or more mounting holes 190 may be provided to mount syrup inlet vacuum transducer 64 and hose in place sensor 178 to CIP connector 70.

Referring to FIGS. 15-17, nozzle cap 36 (which may be the same as nozzle cap 42) may have an open end with threads 214 for connecting nozzle cap 36 to dispensing valve 34. Threads 214 may be quarter-turn or other suitable threads. Alternatively, any other suitable means for connecting nozzle cap 36 to dispensing valve 34 may be used, such as press fit, quick connect, or the like. Nozzle cap 36 may have a cutout 202 to accommodate a drain conduit of dispensing valve 34. A sensor trigger 210 may be provided on nozzle cap 36 which may cause nozzle cap in place sensor 252 to send a signal to microcontroller 288 when nozzle cap 36 is connected to dispensing valve 34. Nozzle cap 36 may have a protrusion 212 with an internal reservoir 204 in which a cleaning/sanitizing agent 206 is disposed. A film 208 may be provided to seal cleaning/sanitizing agent 206 within reservoir 204 until film 208 is melted or dissolved due to contact with water or other fluid of a sufficient temperature, at which point cleaning/sanitizing agent 206 may be released from reservoir 204. In some embodiments, film 208 may not be present. Nozzle cap 36 may be a single use apparatus, or nozzle cap 36 may be used for more than one CIP process. In some embodiments, cleaning/sanitizing agent 206 may be in the form of a module or packet, and nozzle cap 36 may be refillable with such a module or packet for each use. As shown in FIGS. 15 and 17, nozzle cap 36 may have no inlet or outlet other than the open end.

Referring to FIGS. 18-19, BIB connector 66 (which may be the same as BIB connector 82) may have a connector body 222 with a shaft 230 slidably disposed therein. Shaft 230 may have a flow path 242 extending from an inlet 238 having a plurality of inlet ports 246 to an outlet having a plurality of outlet ports 248. Product may flow through shaft 230 as shown by flow path arrows 240. Shaft 230 may slide from a first position (not shown) in which outlet ports 248 are closed off to a second position (shown in FIG. 19) in which outlet ports 248 are in open fluid communication with flow path 244 and outlet fitting 220. A spring 224 may provide a biasing force on spring stop 232 to bias shaft 230 toward the closed position. A pair of retainer clips 216 may be mounted to connector body 222 with retaining pins 250, and springs 266 may provide a biasing torque to bias clips 216 in a closed or clamped position. Clips 216 may be used to fasten BIB connector 66 to a spout on a BIB product package 68 during normal operation of dispenser 200, 300. Threads 218 may be used to fasten BIB connector 66 to threaded connector 186 of CIP connector 70 during operation of CIP system 100 as described herein. Inlet 238 may be configured to mate with a spout on a BIB product package 68 and with piston 194 of CIP connector 70. A seal 236 may provide a sealing engagement of shaft 230 with a spout on a BIB product package 68. A retaining pin 234 may be provided to prevent shaft 230 from being completely withdrawn from BIB connector 66 and may also limit inward travel of shaft 230. A lower O-ring 226 and an upper O-ring 228 may be provided for sealing engagement of shaft 230 within body 222 to ensure shut-off of the flow path when shaft 230 is in the first (closed) position.

Figure 20:
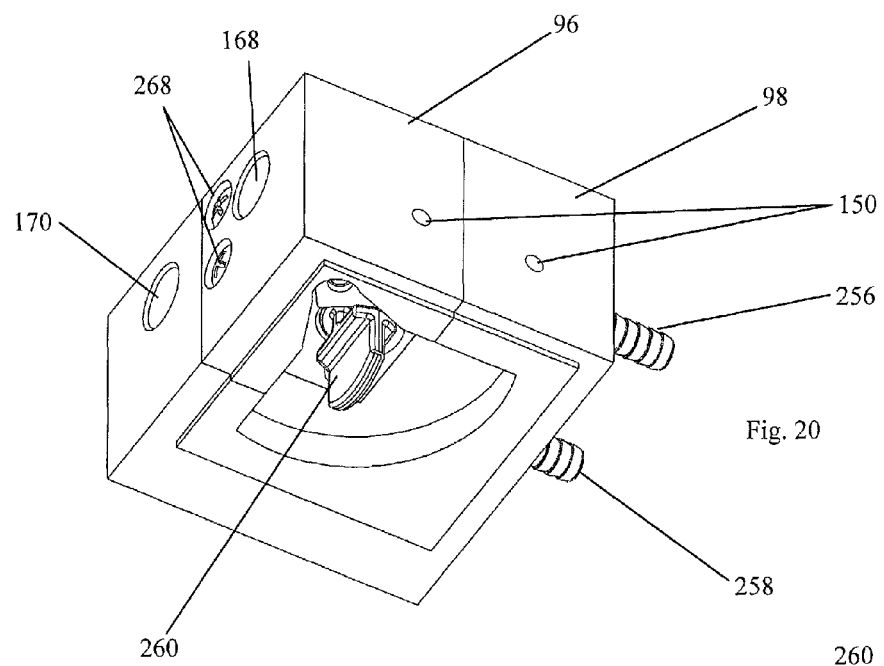
FIG. 20 is a bottom perspective view of a water/drain quick disconnect.
Figure 21:
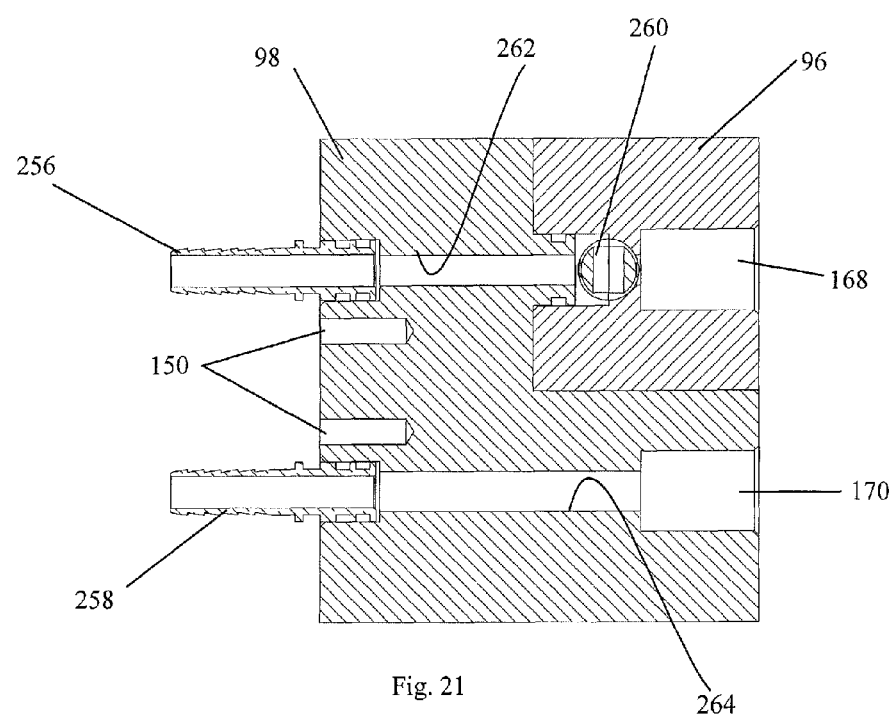
FIG. 21 is a cross-sectional view of the water/drain quick disconnect of FIG. 20.

Referring to FIGS. 20-21, a water/drain quick disconnect water body 96 and a water/drain quick disconnect main body 98 may be joined together with one or more connectors 268 as shown. A water flow path 262 may extend from a water inlet fitting 256 through a quick disconnect water shut off 260 to a water inlet quick disconnect receiver 168, which may be configured to receive water quick disconnect fitting 172 (see FIG. 11). A drain flow path may extend from a drain outlet quick disconnect receiver 170 to a drain outlet fitting 258. Drain outlet quick disconnect receiver 170 may be configured to receive drain outlet quick disconnect fitting 174 (see FIG. 11). One or more mounting holes 150 may be provided for mounting water/drain quick disconnect water body 96 and water/drain quick disconnect main body 98 to dispenser 200, 300. Quick disconnect water shut off 260 may be used to easily shut off the water supply to CIP system 100. Together, water/drain quick disconnect water body 96 and water/drain quick disconnect main body 98 form an assembly by which dispenser 200, 300 may be quickly and easily connected to and disconnected from a water source and a drain.

CIP Process Flow Description

Figure 6:
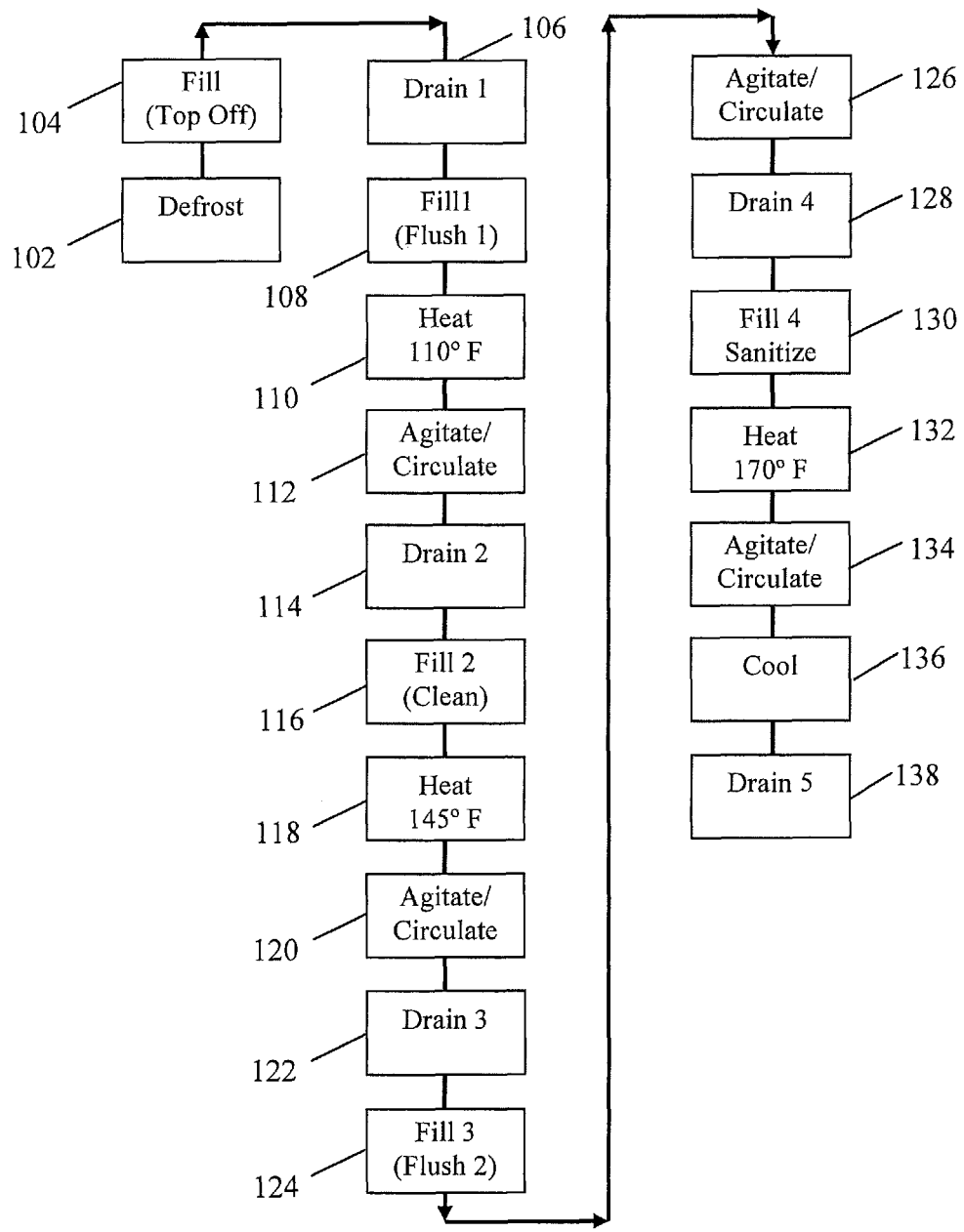
FIG. 6 is a flowchart illustrating a CIP process.

When a condition exists that requires the dispenser 200, 300 to be cleaned and sanitized as determined by preset conditions entered into microcontroller 288, or by an operator on demand, the operator may put in place a nozzle cap 36, 42 on the dispensing valve 34, 40. The BIB connector 66, 82 may then be removed from the product BIB 68, 78 and placed on the CIP connector 70, 80. Position sensors 252, 254 detect that nozzle caps 36, 42 are installed on dispensing valves 34, 40, and position sensors 178, 272 detect that BIB connectors 66, 82 are connected to the CIP connectors 70, 80. When both position sensors 252, 254 and position sensors 178, 272 detect the installed condition, the microcontroller 288 may initiate the Clean in Place (CIP) process as illustrated in FIG. 6 and further described below.

Defrost

Figure 2:
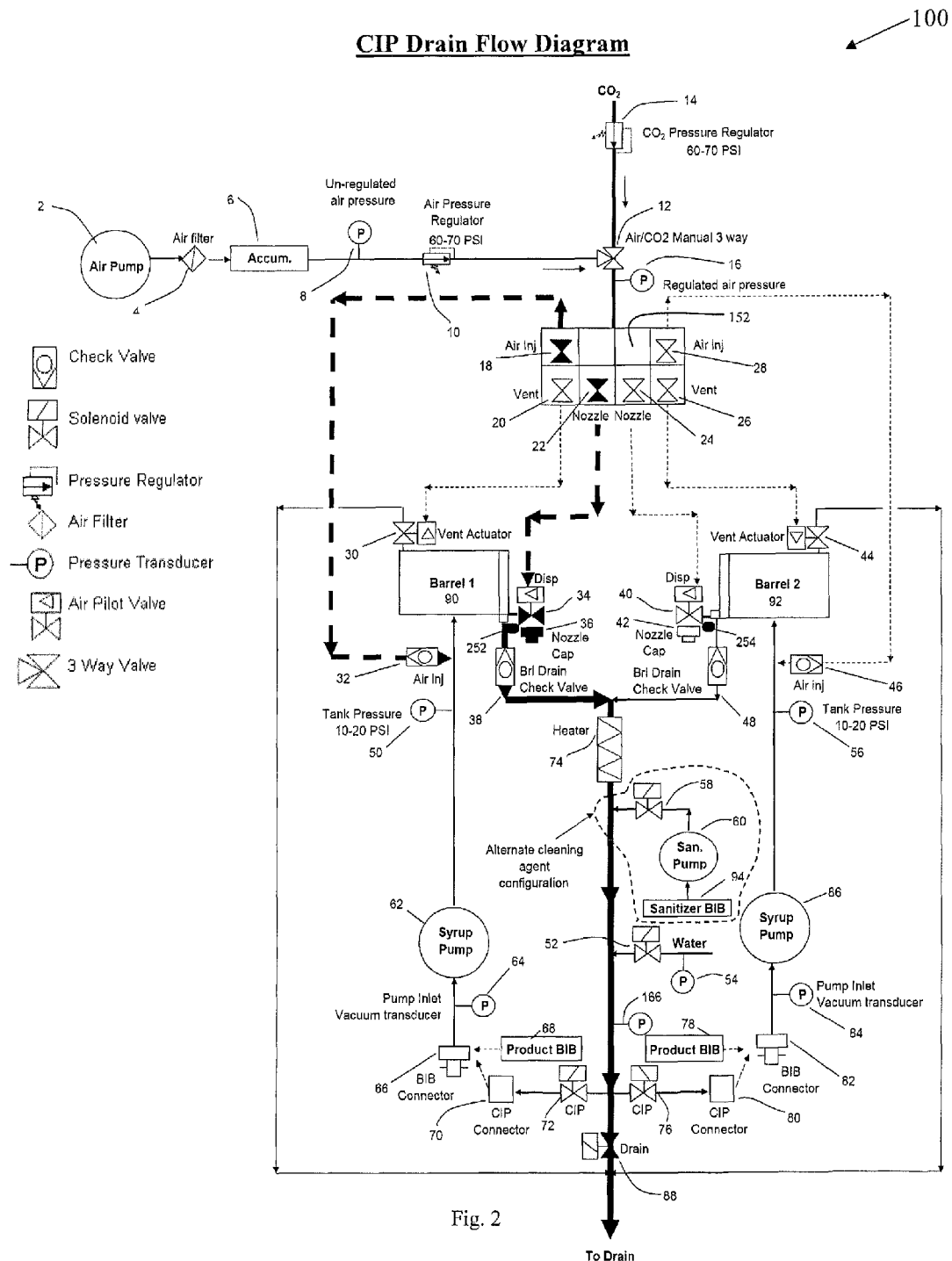
FIG. 2 is a schematic diagram of the CIP system of FIG. 1 shown in a drain flow mode.

In frozen food or beverage embodiments, when cleaning begins, product in barrel 90, 92 may be defrosted in a suitable manner, such as either through a heat pump cycle using a reversing valve in the primary refrigeration system of dispenser 200, 300 or by using a hot gas bypass in the primary refrigeration system, for example. As shown in FIG. 2, once the defrost cycle has been completed, the CIP drain solenoid 88 may be opened and the air injection system may be used to pressurize barrel 90, 92 and open a check valve 38, 48 integrated into the drain conduit for barrel 90, 92 thereby forcing product out of the drain of barrel 90, 92. When draining is complete, the air injection system may be deactivated thereby closing check valve 38, 48 and the drain solenoid 88 may be deactivated thereby closing the system drain.

Product Flush

Figure 3:
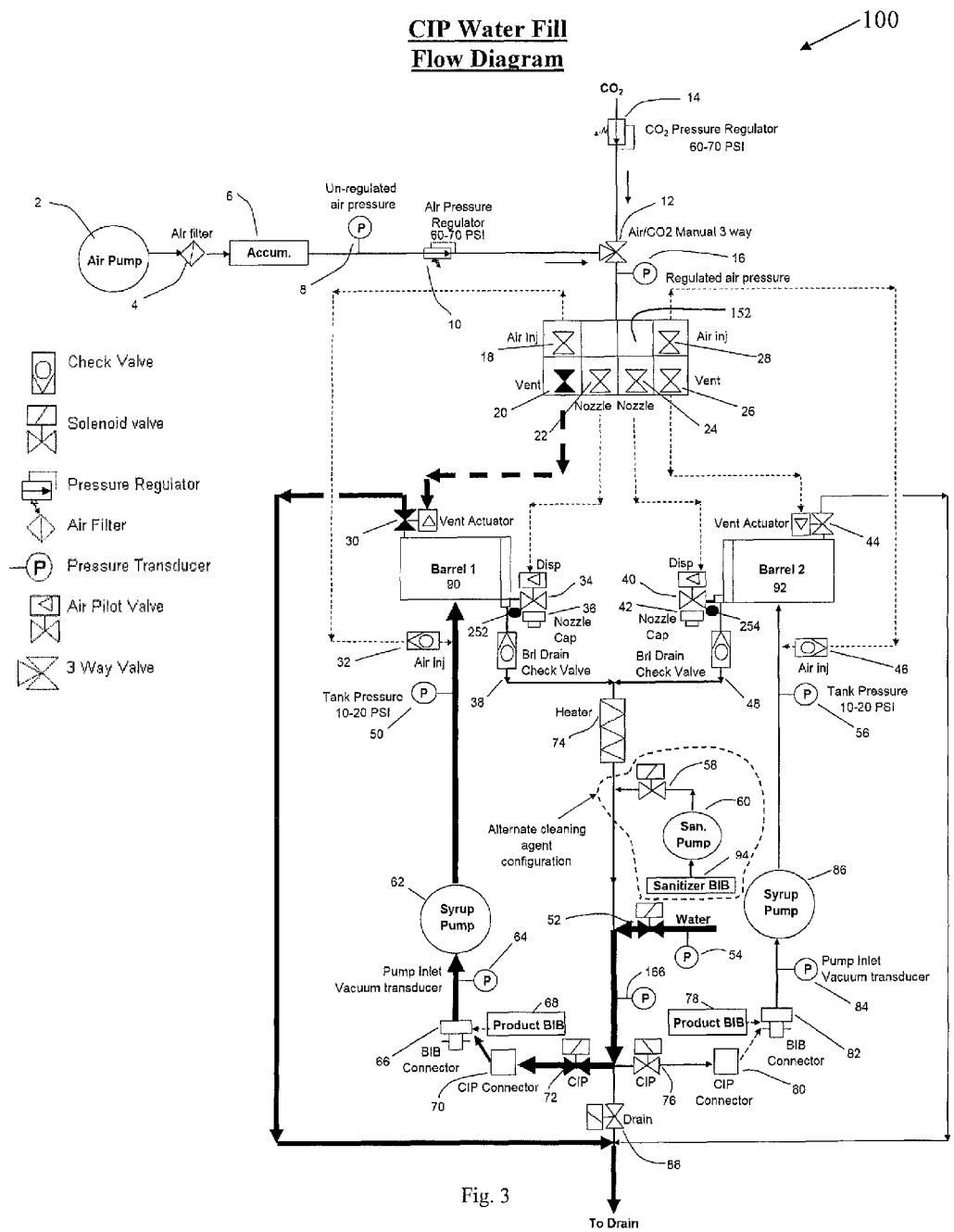
FIG. 3 is a schematic diagram of the CIP system of FIG. 1 shown in a water fill flow mode.

When the drain cycle is complete, the water solenoid valve 52 and the CIP recirculation solenoid valve 72, 76 for the respective barrel 90, 92 may be energized open as shown in FIG. 3. During this timed event, the vent valve 30, 44 may be actuated allowing water to fill the barrel 90, 92 and overflow through the vent valve 30, 44 to flush any remaining defrosted liquid product out the vent conduit. Also during this timed event, the vent air solenoid 20, 26 may be energized and de-energized thereby opening and closing the barrel vent actuator 30, 44 at specific intervals to assist in flushing the vent conduit. The air injection solenoid 18, 28 may also cycle during this time to allow the barrel 90, 92 to reach a specific pressure during the fill process.

When the timed flush event is completed, the water solenoid 52 may be de-energized and the vent actuator 30, 44 may be closed. The CIP recirculation solenoid valve 72, 76 for the respective barrel 90, 92 may remain energized open and the solution of water and defrosted product may be circulated through the CIP system by use of a liquid pump 62, 86, ingredient fill conduit, and associated CIP plumbing. During this circulation of solution, agitation of the solution may occur in the barrel 90, 92 by rotating beater bars (not shown) inside barrel 90, 92 in clockwise and counterclockwise directions using beater motors 144, 306, 270.

During the circulation process, the dispense air solenoid 22, 24 may be actuated thereby opening the dispensing valve 34, 40. In some embodiments, the dispense air solenoid 22, 24 may be intermittently or periodically energized and de-energized to both open and close the dispensing valve 34, 40 thereby introducing agitation on the dispensing valve 34, 40. In some variations, this opening and closing of dispensing valve 34, 40 may be used to activate a pump integrated into nozzle cap 36, 42 to circulate fluid through the dispensing valve 34, 40. Also during the circulating process, the inline heater 74 or in alternate configurations the heat pump may be used to elevate the temperature of the rinse solution to a desired temperature. Although heater 74 is shown positioned upstream from the sanitizer injection point and the water injection point, heater 74 may be located in any desired position in the CIP circuit, and more than one heater may be used if desired.

After the set time for agitating is completed, the CIP recirculation solenoid valve 72, 76 for the respective barrel 90, 92 may be de-energized thereby closing the CIP recirculation solenoid valve 72, 76, and the fluid pump 62, 86 may be stopped. The CIP drain solenoid 88 and the dispense air solenoid 22, 24 may be energized thereby opening the dispensing valve 34, 40 and the CIP drain. Also at this time, if a heating method was initiated to elevate the temperature of the solution, it may be deactivated. Air may then be supplied by energizing the air injection solenoid 18, 28. This air pressure may be used to pressurize the barrel 90, 92 thereby opening a check valve 38, 48 integrated into the drain conduit for the barrel 90, 92 thereby forcing product out the drain of the barrel 90, 92. When draining is complete, the air injection solenoid 18, 28 and the drain solenoid 88 may be de-energized thereby closing the check valve stopping the drain cycle. The beater motor 144, 306, 270 may also be stopped at this time.

Barrel Cleaning

Figure 4:
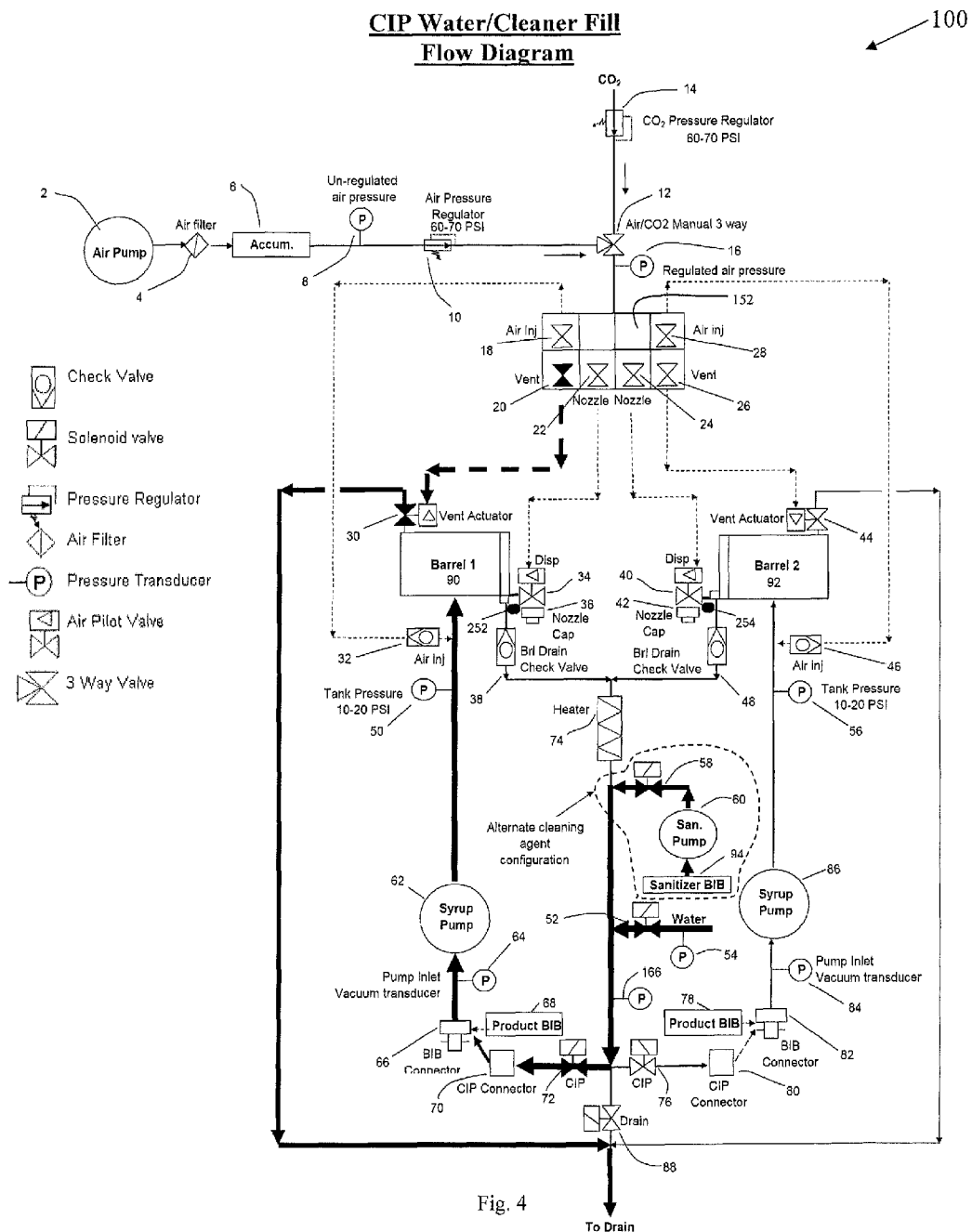
FIG. 4 is a schematic diagram of the CIP system of FIG. 1 shown in a water/cleaner fill flow mode.

In some embodiments, when the drain solenoid valve 88 is de-energized closed, the respective CIP recirculation solenoid valve 72, 76 may be energized open and the sanitizer/cleaner solenoid valve 58 may be opened and the sanitizer/cleaner pump 60 may be activated for a set amount of time, as shown in FIG. 4. For example, a positive displacement solenoid pump 60 may be used to precisely meter the amount of cleaning/sanitizing agent that is introduced to the system. Upon completion of this timed event, the sanitizer/cleaner solenoid valve 58 may be de-energized closed, and the water solenoid valve 52 and the CIP recirculation solenoid valve 72, 76 for the respective barrel 90, 92 may be energized open. During this timed event, the vent valve 30, 44 may be actuated thereby allowing water to fill the barrel 90, 92 and overflow through the vent 30, 44 to flush any remaining defrosted liquid product out the vent conduit. Also during this timed event, the vent air solenoid 20, 26 may be energized and de-energized thereby opening and closing the vent actuator 30, 44 at specific intervals to assist in flushing the vent conduit. The air injection solenoid 18, 28 may also cycle during this time to allow the barrel 90, 92 to reach a specific pressure during the fill process.

Once the fill sequence is completed, the water solenoid valve 52 may be de-energized closed and the liquid pump 62, 86 may be deactivated. Also, if activated, the air injection 18, 28 and vent actuator 30, 44 may be deactivated. Then during a timed event the water/sanitizer/cleaner fluid may be agitated in the barrel 90, 92 by rotating the beater bars in clockwise and counter-clockwise directions. During this same time, in some embodiments, the dispense air solenoid 22, 24 may be energized and de-energized thereby opening and closing the dispensing valve 34, 40. Alternatively or additionally, the dispense air solenoid 22, 24 may be energized to leave the dispensing valve 34, 40 open. Also at this time, the barrel 90, 92 may be heated to an elevated temperature, such as over 100° F., for example, for a set time. The vent conduit of the barrel 90, 92 may also be flushed at this time. This may occur by energizing the vent solenoid 20, 26 open, actuating the CIP vent 30, 44, while at the same time with the CIP recirculation solenoid valve 72, 76 open, the water solenoid 52 is energized open to introduce water into the recirculation path forcing an overflow of cleaning solution into the vent conduit. This process may occur in singular form or may be repeated several times over a timed interval. Upon completion of the high temperature agitation and timed agitation events (dispense cycles, and beater rotations), the barrel 90, 92 may again be drained.

After the set time for agitating is completed, the CIP recirculation solenoid valve 72, 76 for the respective barrel 90, 92 may be de-energized thereby closing the CIP recirculation solenoid valve 72, 76, and the fluid pump 62, 86 may be stopped. The CIP drain solenoid 88 and the dispense air solenoid 22, 24 may be energized thereby opening the dispensing valve 34, 40 and the CIP drain. Also at this time, if a heating method was initiated to elevate the temperature of the solution, it may be deactivated. Air may then be supplied by energizing the air injection solenoid 18, 28. This air pressure may be used to pressurize the barrel 90, 92 thereby opening a check valve 38, 48 integrated into the drain conduit for the barrel 90, 92 thereby forcing product out the drain of the barrel 90, 92. When draining is complete, the air injection solenoid 18, 28 and the drain solenoid 88 may be de-energized thereby closing the check valve stopping the drain cycle. The beater bars may also be stopped at this time.

Cool Water Rinse

In some embodiments, the cool rinse may be omitted, and in other configurations either a heat pump system or an inline heater 74 may be used to elevate the temperature of the rinse solution during a circulation step. The water solenoid valve 52 may be energized open. During this timed event, the CIP drain solenoid 88 may be de-energized closed and the CIP recirculation solenoid valve 72, 76 may be energized open. The barrel 90 92 may then be filled by use of a liquid pump 62, 86, and ingredient fill conduit. As the barrel 90, 92 is filling, the vent air solenoid 20, 26 may be actuated to open and close the vent actuator 30, 44. The air injection solenoid 18, 28 may also cycle during this time to allow the barrel 90, 92 to reach a specific pressure upon high fill.

Once the fill sequence is completed, the water solenoid valve 52 may be de-energized closed and the fill water may be agitated in the barrel 90, 92 by rotating the beater bars in clockwise and counter-clockwise directions. In some embodiments, during this same time the dispense air solenoid 22, 24 may be energized and de-energized thereby opening and closing the dispensing valve 34, 40. In some embodiments, the dispense air solenoid 22, 24 may be energized thereby opening the dispensing valve 34, 40 for the length of timed event. Upon completion of the flush and timed agitation events (dispense cycles, and beater rotations), the barrel 90, 92 may again be drained.

The CIP recirculation solenoid valve 72, 76 for the respective barrel 90, 92 may be de-energized thereby closing the CIP recirculation solenoid valve 72, 76 and the fluid pump 62, 86 may be stopped. The CIP drain solenoid 88 and the dispense air solenoid 22, 24 may be energized thereby opening the dispensing valve 34, 40 and the CIP drain. Also at this time, if a heating method was initiated to elevate the temperature of the solution, it may be deactivated. Air may then be supplied by energizing the air injection solenoid 18, 28. This air pressure may be used to pressurize the barrel 90, 92 thereby opening check valve 38, 48 and thereby forcing product out the drain of the barrel 90, 92. When draining is complete, the air injection solenoid 18, 28 and the drain solenoid 88 may be de-energized thereby closing the check valve 38, 48 and stopping the drain cycle. The beater bars may also be stopped at this time.

Heated Water Sanitization

When the draining of barrel 90, 92 is complete, the water solenoid valve 52 may be energized open. During this timed event, the CIP drain solenoid 88 may be de-energized closed and the CIP recirculation solenoid valve 72, 76 may be energized open. The barrel 90, 92 may then be filled by use of a liquid pump 62, 86 and ingredient fill conduit. As the barrel 90, 92 is filling, the vent air solenoid 20, 26 may be energized and de-energized to open and close the vent actuator 30, 44 of barrel 90, 92. The air injection solenoid 18, 28 may also cycle during this time to allow the barrel 90, 92 to reach a specific pressure upon high fill. In some embodiments, an additional cleaning/sanitizing agent may be introduced into the CIP system during this timed event.

Figure 5:
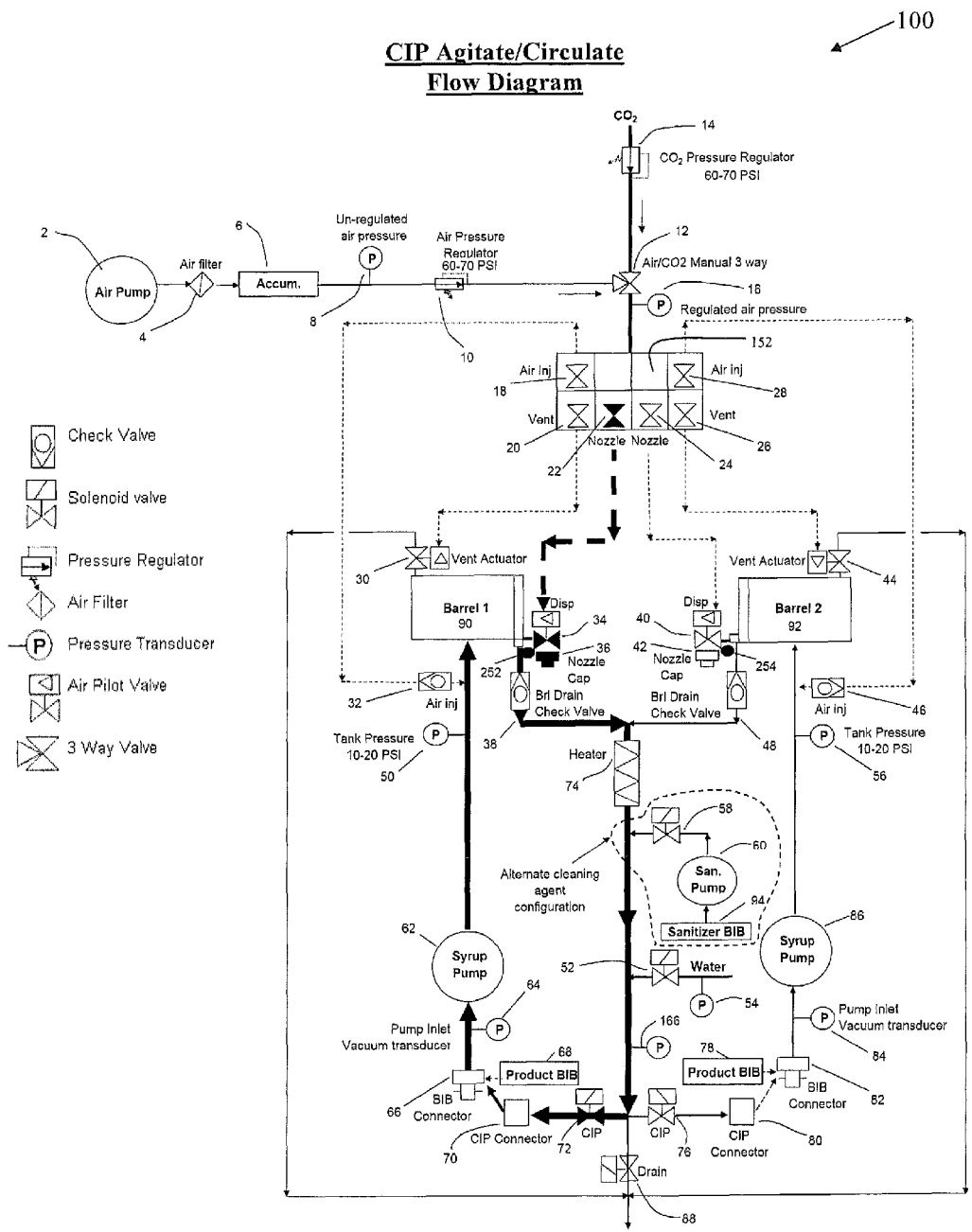
FIG. 5 is a schematic diagram of the CIP system of FIG. 1 shown in an agitate/circulate flow mode.

Once the fill sequence is completed, as shown in FIG. 5, the water solenoid valve 52 may be de-energized closed and the fill water may be agitated in the barrel 90, 92 by rotating the beater bars in clockwise and counter-clockwise directions. Also at this time the water may be circulated through the CIP system and the barrel 90, 92. With the use of an inline heater 74, or heat pump refrigeration system, the solution in the CIP system may be heated to a desired temperature, such as in excess of 165° F. or 170° F., for example, for a desired timed duration, such as about 30 seconds or more, for example. In some embodiments, less than 30 seconds may be sufficient. In some embodiments, during this time the dispense air solenoid 22, 24 may be energized and de-energized thereby opening and closing the dispensing valve 34, 40. In alternate configurations, the dispense air solenoid 22, 24 may be energized thereby opening the dispensing valve 34, 40 for the duration of the timed event. Upon completion of the heated flush and timed agitation events (dispense cycles, and beater rotations), the barrel 90, 92 may again be drained.

The CIP recirculation solenoid valve 72, 76 for the respective barrel 90, 92 may be de-energized thereby closing the CIP recirculation solenoid valve 72, 76, and the fluid pump 62, 86 may be stopped. The CIP drain solenoid 88 and the dispense air solenoid 22, 24 may be energized thereby opening the dispensing valve 34, 40 and the CIP drain. Also at this time, if a heating method was initiated to elevate the temperature of the solution, it may be deactivated. Air may then be supplied by energizing the air injection solenoid 18, 28. This air pressure may be used to pressurize the barrel 90, 92 thereby opening check valve 38, 48 and thereby forcing product out the drain of barrel 90, 92. When draining is complete, the air injection solenoid 18, 28 and the drain solenoid 88 may be de-energized thereby closing the check valve 38, 48 and stopping the drain cycle. The beater bars may also be stopped at this time.

At this time, the CIP process may be complete and the CIP system 100 may wait until the user disconnects the ingredient fill conduit from the CIP connector 70, 80 and removes the nozzle cap 36, 42 from dispensing valve 34, 40. An ingredient BIB 68, 78 or other product container may then be connected to the ingredient fill conduit and the barrel 90, 92 may undergo a normal product fill routine. During set-up of dispenser 200, 300, the source of pressurizing gas can be set to use customer supplied $CO_2$ or compressed air from an integral air pump 2. This gas may be used during all product fill and barrel pressurization routines. The CIP process described above may be used in a sealed beverage dispenser 200, 300, and the CIP process may also be adapted for use in "open hopper" dispensers that are open to atmospheric conditions and subsequent contamination.

In some embodiments, CIP systems as described herein may be used for pasteurizing and/or sterilizing products to be dispensed from food and beverage dispensers of which such CIP systems form a part. To accomplish this, nozzle cap 36, 42 may be put in place on dispensing valve 34, 40, and BIB connector 66, 82 may be connected to CIP connector 70, 80, and a heated circulate/agitate process may be conducted to pasteurize the product. In an alternate configuration, dispensing valve 34, 40 and nozzle cap 36, 42 may be replaced by a multiple position dispensing valve that has a double-acting dispensing valve actuator which allows the internal operator of the dispensing valve to rise up above a static position to dispense product and alternately lower below the static position to seal the product outlet and allow flow into the CIP circuit. The opening of this circuit allows for the product to circulate through the CIP system for heat pasteurization. Subsequently this arrangement allows for the pasteurization and/or sterilization of the product to be performed as required or desired.

Although the foregoing description contemplates manual connection and disconnection of nozzle cap 36, 42 and CIP connector 70, 80 to facilitate operation of the CIP process, persons of ordinary skill in the art will appreciate that the apparatus disclosed herein may be adapted such that automated switching between normal and CIP flow paths may be accomplished without the need for manual connection or disconnection of such components by a user. Additionally, it will be appreciated that the CIP process for barrels 90 and 92 may be accomplished independently or concurrently. The CIP system for each barrel 90, 92 may have its own water source, cleaner/sanitizer source, heater, pump, drain, and other components, or such components may be shared by a CIP system that serves both barrels 90 and 92. Also, in some embodiments, fewer than all of the aforementioned process steps may be performed or additional steps may be performed, depending on the desired application.

The embodiments described above are some examples of the current invention. Various modifications and changes of the current invention will be apparent to persons of ordinary skill in the art. Among other things, any feature described for one embodiment may be used in any other embodiment. Additionally, improvements described herein may be used in connection with the subject matter described in U.S. patent application Ser. No. 11/467,852 filed on Aug. 28, 2006, the disclosure of which is incorporated herein by reference. The scope of the invention is defined by the attached claims and other claims to be drawn to this invention, considering the doctrine of equivalents, and is not limited to the specific examples described herein.

What is claimed is:

1. A method of cleaning a food or beverage dispenser having a product barrel in fluid communication with a drain conduit, a dispensing valve in fluid communication with said product barrel, a nozzle cap removably connectable in fluid communication with said dispensing valve, said nozzle cap comprising an open end and a reservoir and a cleaning/sanitizing agent disposed in said reservoir, said nozzle cap having no inlet or outlet other than said open end, a water inlet in fluid communication with said drain conduit, a CIP connector in fluid communication with said drain conduit, a BIB connector removably connectable in fluid communication with said CIP connector, wherein said BIB connector is configured for alternate connection to said CIP connector and a BIB package, and a pump in fluid communication with said BIB connector and said product barrel, said method comprising:

connecting said nozzle cap to said dispensing valve;
    disconnecting said BIB connector from said BIB package;
    connecting said CIP connector to said BIB connector; and
    operating said pump to circulate water from said water inlet through said product barrel, said dispensing valve, said drain conduit, said CIP connector, and said BIB connector;
    wherein said water passes into and out of said open end of said nozzle cap such that said cleaning/sanitizing agent is released from said reservoir into said water.

2. The method of claim 1 further comprising heating said water.

3. The method of claim 2 wherein said nozzle cap further comprises a film configured to seal said cleaning/sanitizing agent within said reservoir, and wherein said cleaning/sanitizing agent is released into said water by dissolving said film upon contact with said water at a predetermined temperature.

4. The method of claim 1 further comprising:
    defrosting said product barrel;
    filling said product barrel with water in a top-off filling;
    draining said water and defrosted product from said product barrel in a first draining;
    filling said product barrel with water in a first filling;
    heating said water to a first temperature;
    circulating said water through said dispenser in a first circulation cycle;
    draining said water from said product barrel in a second draining;
    filling said product barrel with water in a second filling;
    heating said water to a second temperature;
    circulating said water through said dispenser in a second circulation cycle;
    draining said water from said product barrel in a third draining;
    filling said product barrel with water in a third filling;
    circulating said water through said dispenser in a third circulation cycle;
    draining said water from said product barrel in a fourth draining;
    filling said product barrel with water in a fourth filling;
    heating said water to a third temperature;
    circulating said water through said dispenser in a fourth circulation cycle;
    cooling said water; and
    draining said water from said product barrel in a fifth draining.

5. The method of claim 4 further comprising:
    during at least one of said circulation cycles, agitating said water in said product barrel by rotating one or more beater bars within said product barrel.

\* \* \* \* \*